(12) United States Patent
Zhi et al.

(10) Patent No.: US 11,424,081 B2
(45) Date of Patent: Aug. 23, 2022

(54) ELECTRICAL ENERGY STORAGE APPARATUS AND A METHOD OF PREPARING THE SAME

(71) Applicant: City University of Hong Kong, Kowloon (HK)

(72) Inventors: Chunyi Zhi, New Territories (HK); Longtao Ma, Kowloon Tong (HK); Hongfei Li, Kowloon Tong (HK); Zijie Tang, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 530 days.

(21) Appl. No.: 16/377,608

(22) Filed: Apr. 8, 2019

(65) Prior Publication Data

US 2020/0321164 A1    Oct. 8, 2020

(51) Int. Cl.
| | |
|---|---|
| *H01M 4/38* | (2006.01) |
| *H01G 11/08* | (2013.01) |
| *H01G 11/06* | (2013.01) |
| *H01G 11/62* | (2013.01) |
| *H01G 11/78* | (2013.01) |
| *H01M 12/06* | (2006.01) |
| *H01M 16/00* | (2006.01) |
| *H01G 11/86* | (2013.01) |

(52) U.S. Cl.
CPC ............ *H01G 11/08* (2013.01); *H01G 11/06* (2013.01); *H01G 11/62* (2013.01); *H01G 11/78* (2013.01); *H01G 11/86* (2013.01); *H01M 4/38* (2013.01); *H01M 12/06* (2013.01); *H01M 16/003* (2013.01); *H01M 2300/0005* (2013.01)

(58) Field of Classification Search
CPC ....... H01M 4/38; H01M 12/06; H01M 16/003
See application file for complete search history.

(56) References Cited

U.S. PATENT DOCUMENTS

| | | | |
|---|---|---|---|
| 2014/0087227 A1* | 3/2014 | Shih .................. | H01M 10/0562 429/99 |
| 2015/0228986 A1* | 8/2015 | Wang ...................... | H01M 4/06 429/118 |
| 2017/0081248 A1* | 3/2017 | Jeong ................ | C04B 35/62886 |

OTHER PUBLICATIONS

Zhang, L. L.; Zhao, X. S., Carbon-based materials as supercapacitor electrodes. Chemical Society Reviews 2009, 38, 2520.
Acerce, M.; Voiry, D.; Chhowalla, M., Metallic 1T phase MoS2 nanosheets as supercapacitor electrode materials. Nature Nanotechnology 2015, 10, 313.

(Continued)

*Primary Examiner* — Olatunji A Godo
(74) *Attorney, Agent, or Firm* — Renner Kenner Greive Bobak Taylor & Weber

(57) ABSTRACT

An electrical energy storage apparatus and a method of preparing the same. The electrical energy storage apparatus includes a first energy storage device arranged to supply electrical energy to an external electrical load; a second energy storage device arranged to recharge the first energy storage when at least a portion of the second energy storage device is exposed to air. The second energy storage device includes an encapsulation arranged to selectively block an air exposure to the second energy storage device, so as to maintain the second energy storage device in an idle state.

23 Claims, 21 Drawing Sheets

(56) References Cited

OTHER PUBLICATIONS

Dubai, D. P.; Ayyad, O.; Ruiz, V.; Gómez-Romero, P., Hybrid energy storage: the merging of battery and supercapacitor chemistries. Chemical Society Reviews 2015, 44, 1777.

Ma, L.; Chen, S.; Li, H.; Ruan, Z.; Tang, Z.; Liu, Z.; Wang, Z.; Huang, Y.; Pei, Z.; Zapien, J. A.; Zhi, C., Initiating a mild aqueous electrolyte Co3O4/Zn battery with 2.2 V-high voltage and 5000-cycle lifespan by a Co(iii) rich-electrode. Energy & Environmental Science 2018, 11, 2521.

Li, H.; Han, C.; Huang, Y.; Huang, Y.; Zhu, M.; Pei, Z.; Xue, Q.; Wang, Z.; Liu, Z.; Tang, Z.; Wang, Y.; Kang, F.; Li, B.; Zhi, C., An extremely safe and wearable solid-state zinc ion battery based on a hierarchical structured polymer electrolyte. Energy & Environmental Science 2018, 11, 941.

Dong, L.; Ma, X.; Li, Y.; Zhao, L.; Liu, W.; Cheng, J.; Xu, C.; Li, B.; Yang, Q.-H.; Kang, F., Extremely safe, high-rate and ultralong-life zinc-ion hybrid supercapacitors. Energy Storage Materials 2018, 13, 96.

Kundu, D.; Adams, B. D.; Duffort, V.; Vajargah, S. H.; Nazar, L. F., A high-capacity and long-life aqueous rechargeable zinc battery using a metal oxide intercalation cathode. Nature Energy 2016, 1, 16119.

Wang, F.; Borodin, O.; Gao, T.; Fan, X.; Sun, W.; Han, F.; Faraone, A.; Dura, J. A.; Xu, K.; Wang, C., Highly reversible zinc metal anode for aqueous batteries. Nature Materials 2018, 17, 543.

Stephenson, T.; Li, Z.; Olsen, B.; Mitlin, D., Lithium ion battery applications of molybdenum disulfide (MoS2) nanocomposites. Energy & Environmental Science 2014, 7, 209.

Li, X.; Gu, M.; Hu, S.; Kennard, R.; Yan, P.; Chen, X.; Wang, C.; Sailor, M. J.; Zhang, J.-G.; Liu, J., Mesoporous silicon sponge as an anti-pulverization structure for high-performance lithium-ion battery anodes. Nature Communications 2014, 5, 4105.

Tang, Y.; Zhang, Y.; Li, W.; Ma, B.; Chen, X., Rational material design for ultrafast rechargeable lithium-ion batteries. Chemical Society Reviews 2015, 44, 5926.

Zhong, Y.; Xia, X.; Mai, W.; Tu, J.; Fan, H. J., Integration of Energy Harvesting and Electrochemical Storage Devices. Advanced Materials Technologies 2017, 2, 1700182.

Huang, Y.; Li, Z.; Pei, Z.; Liu, Z.; Li, H.; Zhu, M.; Fan, J.; Dai, Q.; Zhang, M.; Dai, L.; Zhi, C., Solid-State Rechargeable Zn//NiCo and Zn-Air Batteries with Ultralong Lifetime and High Capacity: The Role of a Sodium Polyacrylate Hydrogel Electrolyte. Advanced Energy Materials 2018, 11, 1802288.

Zi, Y.; Niu, S.; Wang, J.; Wen, Z.; Tang, W.; Wang, Z. L., Standards and figure-of-merits for quantifying the performance of triboelectric nanogenerators. Nature Communications 2015, 6, 8376.

Law, M.; Greene, L. E.; Johnson, J. C.; Saykally, R.; Yang, P., Nanowire dye-sensitized solar cells. Nature Materials 2005, 4, 455.

Hagfeldt, A.; Boschloo, G.; Sun, L.; Kloo, L.; Pettersson, H., Dye-Sensitized Solar Cells. Chemical Reviews 2010, 110, 6595.

Ma, L.; Chen, S.; Pei, Z.; Li, H.; Wang, Z.; Liu, Z.; Tang, Z.; Zapien, J. A.; Zhi, C., Flexible Waterproof Rechargeable Hybrid Zinc Batteries Initiated by Multifunctional Oxygen Vacancies-Rich Cobalt Oxide. ACS Nano 2018, 12, 8597.

Du, P.; Hu, X.; Yi, C.; Liu, H. C.; Liu, P.; Zhang, H.-L.; Gong, X., Self-Powered Electronics by Integration of Flexible Solid-State Graphene-Based Supercapacitors with High Performance Perovskite Hybrid Solar Cells. Advanced Functional Materials 2015, 25, 2420.

Fu, Y.; Wu, H.; Ye, S.; Cai, X.; Yu, X.; Hou, S.; Kafafy, H.; Zou, D., Integrated power fiber for energy conversion and storage. Energy & Environmental Science 2013, 6, 805.

Wen, Z.; Yeh, M.-H.; Guo, H.; Wang, J.; Zi, Y.; Xu, W.; Deng, J.; Zhu, L.; Wang, X.; Hu, C.; Zhu, L.; Sun, X.; Wang, Z. L., Self-powered textile for wearable electronics by hybridizing fiber-shaped nanogenerators, solar cells, and supercapacitors. Science Advances 2016, 2, 1600097.

Dong, K.; Wang, Y.-C.; Deng, J.; Dai, Y.; Zhang, S. L.; Zou, H.; Gu, B.; Sun, B.; Wang, Z. L., A Highly Stretchable and Washable All-Yarn-Based Self-Charging Knitting Power Textile Composed of Fiber Triboelectric Nanogenerators and Supercapacitors. ACS Nano 2017, 11, 9490.

Wang, Z.; Ruan, Z.; Ng, W. S.; Li, H.; Tang, Z.; Liu, Z.; Wang, Y.; Hu, H.; Zhi, C., Integrating a Triboelectric Nanogenerator and a Zinc-Ion Battery on a Designed Flexible 3D Spacer Fabric. Small Methods 2018, 11, 1800150.

Lin, Z.; Chen, J.; Li, X.; Zhou, Z.; Meng, K.; Wei, W.; Yang, J.; Wang, Z. L., Triboelectric Nanogenerator Enabled Body Sensor Network for Self-Powered Human Heart-Rate Monitoring. ACS Nano 2017, 11, 8830.

Guo, T.; Liu, G.; Pang, Y.; Wu, B.; Xi, F.; Zhao, J.; Bu, T.; Fu, X.; Li, X.; Zhang, C.; Wang, Z. L., Compressible hexagonal-structured triboelectric nanogenerators for harvesting tire rotation energy. Extreme Mechanics Letters 2018, 18, 1.

Zhao, X. J.; Kuang, S. Y.; Wang, Z. L.; Zhu, G., Highly Adaptive Solid-Liquid Interfacing Triboelectric Nanogenerator for Harvesting Diverse Water Wave Energy. ACS Nano 2018, 12, 4280.

Ma, L.; Chen, S.; Pei, Z.; Huang, Y.; Liang, G.; Mo, F.; Yang, Q.; Su, J.; Gao, Y.; Zapien, J. A.; Zhi, C., Single-Site Active Iron-Based Bifunctional Oxygen Catalyst for a Compressible and Rechargeable Zinc-Air Battery. ACS Nano 2018, 12, 1949.

Chen, P.; Xu, K.; Fang, Z.; Tong, Y.; Wu, J.; Lu, X.; Peng, X.; Ding, H.; Wu, C.; Xie, Y., Metallic Co4N Porous Nanowire Arrays Activated by Surface Oxidation as Electrocatalysts for the Oxygen Evolution Reaction. Angewandte Chemie 2015, 127, 14923.

Wu, R.; Qian, X.; Rui, X.; Liu, H.; Yadian, B.; Zhou, K.; Wei, J.; Yan, Q.; Feng, X.-Q.; Long, Y.; Wang, L.; Huang, Y., Zeolitic Imidazolate Framework 67-Derived High Symmetric Porous Co3O4 Hollow Dodecahedra with Highly Enhanced Lithium Storage Capability. Small 2014, 10, 1932.

Meng, F.; Zhong, H.; Bao, D.; Yan, J.; Zhang, X., In Situ Coupling of Strung Co4N and Intertwined N—C Fibers toward Free-Standing Bifunctional Cathode for Robust, Efficient, and Flexible Zn-Air Batteries. Journal of the American Chemical Society 2016, 138, 10226.

Dong, L.; Xu, C.; Li, Y.; Pan, Z.; Liang, G.; Zhou, E.; Kang, F.; Yang, Q.-H., Breathable and Wearable Energy Storage Based on Highly Flexible Paper Electrodes. Advanced Materials 2016, 28, 9313.

Burke, A., Ultracapacitors: why, how, and where is the technology. Journal of Power Sources 2000, 91, 37.

Ma, L.; Fan, H.; Wei, X.; Chen, S.; Hu, Q.; Liu, Y.; Zhi, C.; Lu, W.; Zapien, J. A.; Huang, H., Towards high areal capacitance, rate capability, and tailorable supercapacitors: Co3O4@polypyrrole core-shell nanorod bundle array electrodes. Journal of Materials Chemistry A 2018, 6, 19058.

Lee, D. U.; Fu, J.; Park, M. G.; Liu, H.; Ghorbani Kashkooli, A.; Chen, Z., Self-Assembled NiO/Ni(OH)2 Nanoflakes as Active Material for High-Power and High-Energy Hybrid Rechargeable Battery. Nano Letters 2016, 16, 1794.

J, B.; Quan, J.; Loh, A.; Chai, J.; Chen, Y.; Tan, C.; Ge, X.; Hor, T. S. A.; Liu, Z.; Zhang, H.; Zong, Y., A Robust Hybrid Zn-Battery with Ultralong Cycle Life. Nano Letters 2017, 17, 156.

Li, H.; Liu, Z.; Liang, G.; Huang, Y.; Huang, Y.; Zhu, M.; Pei, Z.; Xue, Q.; Tang, Z.; Wang, Y.; Li, B.; Zhi, C., Waterproof and Tailorable Elastic Rechargeable Yarn Zinc Ion Batteries by a Cross-Linked Polyacrylamide Electrolyte. ACS Nano 2018, 12, 3140.

Huang, Y.; Tang, Z.; Liu, Z.; Wei, J.; Hu, H.; Zhi, C., Toward Enhancing Wearability and Fashion of Wearable Supercapacitor with Modified Polyurethane Artificial Leather Electrolyte. Nano-Micro Letters 2018, 10 (3), 38.

\* cited by examiner

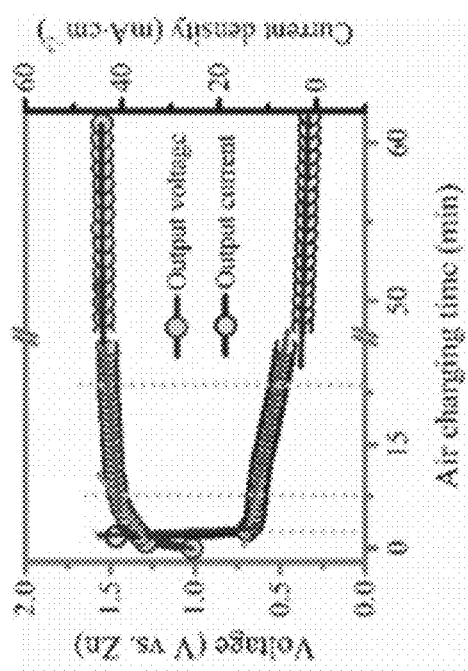
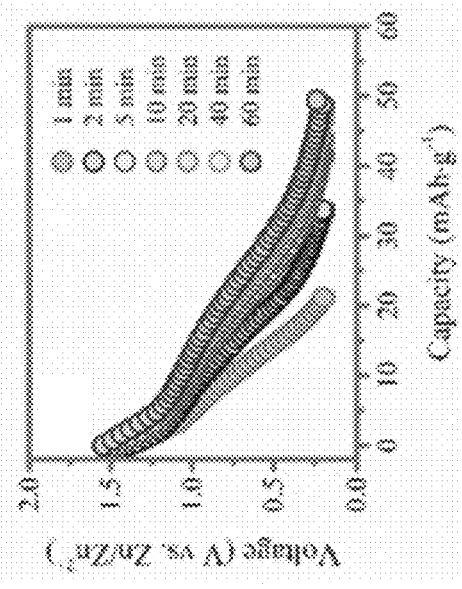
Fig. 11A
Fig. 11B

ELECTRICAL ENERGY STORAGE APPARATUS AND A METHOD OF PREPARING THE SAME

TECHNICAL FIELD

The present invention relates to an electrical energy storage apparatus and a method of preparing the same, in particular, but not exclusively, to an electrical energy storage apparatus that can be recharged when exposing to air.

BACKGROUND

Flexible and wearable devices are growing in use and are starting to become a more mainstream. Flexible and wearable devices are being incorporated into wearable products that are also starting to become more popular and are starting to gain a wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an electrical energy storage apparatus comprising: a first energy storage device arranged to supply electrical energy to an external electrical load; a second energy storage device arranged to recharge the first energy storage when at least a portion of the second energy storage device is exposed to air; wherein the second energy storage device includes an encapsulation arranged to selectively block an air exposure to the second energy storage device, so as to maintain the second energy storage device in an idle state.

In an embodiment of the first aspect, the encapsulation is arranged to selectively block the air exposure to an electrode of the second energy storage device.

In an embodiment of the first aspect, the electrode includes an active material of the second energy storage device.

In an embodiment of the first aspect, the active material is selected from the group consisting of porous carbon/$Co_4N$, Pt/C, $V_2O_5 \cdot xH_2O$ and their combination thereof.

In an embodiment of the first aspect, the electrode is a cathode of the second energy storage device.

In an embodiment of the first aspect, the encapsulation is at least partially removable from the second energy storage device so as to selectively expose to the cathode of the second energy storage device to air.

In an embodiment of the first aspect, wherein when the encapsulation fully covers the cathode of the second energy storage device, the second energy storage device maintains in the idle state.

In an embodiment of the first aspect, the encapsulation includes a sealing tape fully covering the cathode of the second energy storage so as to block the air exposure to the cathode.

In an embodiment of the first aspect, when the encapsulation is at least partially removed from the second energy storage device, the device is activated and is further arranged to recharge the first energy storage device.

In an embodiment of the first aspect, when the electrode is exposed to air, the second energy storage device is activated by oxygen in air in contact with the cathode of the second energy storage device.

In an embodiment of the first aspect, the cathode is arranged to catalyze an oxidation reaction of oxygen in air in contact with the cathode and a reduction reaction at an anode in the second energy storage device so as to generate electrical charges to recharge the first energy storage device.

In an embodiment of the first aspect, the second energy storage device includes a zinc anode.

In an embodiment of the first aspect, the second energy storage device comprises a first electrolyte including a first hydrogel.

In an embodiment of the first aspect, the first hydrogel includes sodium polyacrylate.

In an embodiment of the first aspect, the first energy storage device includes a second electrolyte.

In an embodiment of the first aspect, the second electrolyte is different from the first electrolyte.

In an embodiment of the first aspect, the second electrolyte includes a second hydrogel of polyacrylamide.

In an embodiment of the first aspect, the first energy storage device comprises a cathode including an active material being different from the second energy storage device.

In an embodiment of the first aspect, the first energy storage device comprises a cathode including an active material being the same as that of the second energy storage device.

In an embodiment of the first aspect, the first energy storage device and the second energy storage device include a common anode and/or a common cathode.

In an embodiment of the first aspect, the common anode and/or the common cathode are foldable such that the second energy storage device is stacked on the first energy storage device.

In an embodiment of the first aspect, the common anode and the common cathode are flexible such that in combination with the electrolytes of the first and the second energy storage devices, the energy storage apparatus is arranged to physically deform when subjected to an external mechanical load.

In an embodiment of the first aspect, both the first and the second energy storage devices are recharged when upon receiving electrical power from an external power supply being connected to one or both of the first and the second energy storage devices.

In accordance with the second aspect of the present invention, there is provided a method of fabricating an electrical energy storage apparatus comprising the steps of: providing a first energy storage device arranged to supply electrical energy to an external electrical load; providing a second energy storage device arranged to recharge the first energy storage when at least a portion of the second energy storage device is exposed to air; and encapsulating the second energy storage device using a removable encapsulation; wherein the removable encapsulation is arranged to selectively block an air exposure to the second energy storage device, so as to maintain the second energy storage device in an idle state.

In an embodiment of the second aspect, the method includes the step of forming a first cathode for the second energy storage device and a second cathode for the first energy storage device.

In an embodiment of the second aspect, the step of forming the first cathode and/or the second cathode includes the step of disposing an active material on a substrate.

In an embodiment of the second aspect, the step of forming the first cathode and/or the second cathode further comprises the steps of: depositing graphene on the substrate by thermal chemical vapor deposition; growing a metal-organic coordination compound on the substrate to form a precursor; and subjecting the precursor to a pyrolysis process at a predetermined temperature.

In an embodiment of the second aspect, the step of forming the first cathode and/or the second cathode includes the step of forming a common cathode including the first cathode and the second cathode for the second energy storage device and the first energy storage device respectively.

In an embodiment of the second aspect, the method further comprises the step of stacking the first energy storage device and the second energy storage device.

In an embodiment of the second aspect, the method further comprises the step of sandwiching electrolytes and an anode of both the first energy storage device and the second energy storage device with the common cathode.

In an embodiment of the second aspect, the method further comprises the step of providing a common anode for both the first energy storage device and the second energy storage device.

In an embodiment of the second aspect, the second energy storage device is defined by the common cathode, the common anode and a first electrolyte sandwiched therebetween, and the first energy storage device is defined by the common cathode, the common anode and a second electrolyte sandwiched therebetween.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method process) is terminated when its operations are completed.

In this specification, the word "comprising" and its variations, such as "comprises", has its usual meaning in accordance with international patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 11A is a plot of voltage against air-charging time showing the output voltage profile and corresponding output current of the corresponding output current of "air charging" component.

FIG. 11B is a plot of voltage against capacity showing the discharging curves of the "air-charged" zinc-ion capacitor after different "air-charging" time periods.

DETAILED DESCRIPTION OF THE PREFERRED EMBODIMENTS

Figure 1A:
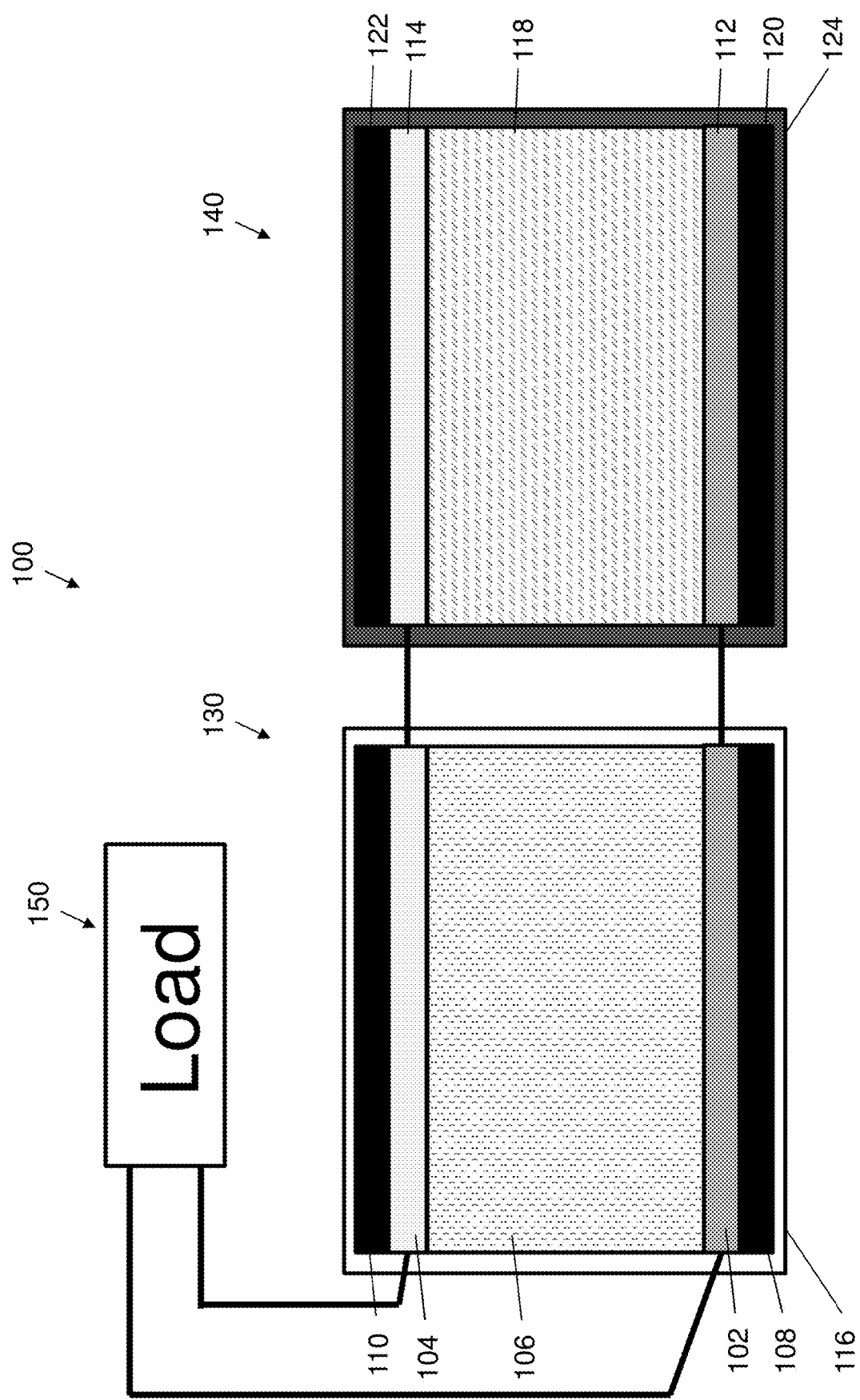
FIG. 1A illustrates of an electrical energy storage apparatus in accordance with one embodiment of the present invention.

The inventors have, through their own research, trials and experiments, devised that flexible electronics may be used in a variety of applications in healthcare, military, and other applications. For example, flexible electronics may be used in wearable electronic device components and devices (i.e wearable electronics), which may include smart fabric materials in the wearable electronics. Preferably, devices including garments made with smart fabrics may be used in a variety of applications such as healthcare to replace bulky instruments and bulky electronic components.

A desirable electrical energy storage apparatus or device for wearable electronics may include the properties of for example high power density, fast charge-discharge rates, and sustainably long operation lifetime. Among these factors, a sustainably long operation lifetime may be particularly important since it may not be always possible for an external power source available for charging the apparatus when it is exhausted. In addition, it may be inconvenient for a user to always bring an external power source along with the electrical energy storage apparatus upon using the wearable electronics.

To further increase the operation lifetime of the electrical energy storage apparatus, other than aiming at a higher energy density for the apparatus, one approach may be integrating energy conversion technologies together with the energy storage units. The integrated/joint system may include an energy harvesting unit that can harvest energy from surroundings such as the natural source of solar, thermal, and wind energies, as well as from our living environments such as human movements, vehicle rotations, water waves, etc. to compensate the energy consumption in the energy storage unit.

The inventors devised that many of the integrated/joint system are designed by crudely connecting different components through external circuit. The system may also be rigid and cumbersome with vastly increased volume, rendering an unfriendly utilization experience to a user. In addition, the two components in the system may be easily detached when being exposed to deformations in response to various unavoidable mechanical forces applied onto the system during routine use, resulting in poor reliability and durability.

Furthermore, as mentioned above, the energy harvesting unit harvests energy from natural resources or from our living environment. That is, the energy harvesting process is highly dependent on the usage scenarios. For example, a solar energy harvesting unit may work well under sufficient sunlight irradiation which is strongly dependent on the weather, district and working conditions (e.g. indoor vs outdoor); whereas a mechanical energy harvesting unit may only be able to collect ambient mechanical energy at sports mode while users may stay quietly during a day in most circumstances. As a result, these systems may not be satisfactory in providing a reliable and long-term power source to the wearable electronics.

Thus, it may be preferable to provide an electrical energy storage apparatus that can be recharged with much less dependency on the usage scenarios while the apparatus possesses excellent flexibility and portability. The inventors have, through their own research, trials and experiments, devised that by scavenging energy from pervasive air, the electrical energy storage apparatus may be conveniently and easily charged without applying additional power sources, such that the apparatus may be recharged anytime at any places.

In accordance with an example embodiment of the present invention, there is provided an electrical energy storage apparatus that can be recharged by exposing the apparatus to air. The apparatus may include a first energy storage device that is arranged to supply electrical energy to an external electrical load, and a second energy storage device that is arranged to recharge the first energy storage device when at least a portion of the second energy storage device is exposed to air. Preferably, the second energy storage device may include an encapsulation arranged to selectively block an air exposure to the second energy storage device, so as to maintain the second energy storage device in an idle state.

With reference to FIG. 1A, there is shown an exemplary embodiment of an electrical energy storage apparatus 100. The electrical energy storage apparatus 100 may be of any suitable form that fits a particular application, such as flat-shaped, fiber-shaped, twisted fiber-shaped etc. Regardless of the shape of the apparatus, it may be substantially arranged to be recharged when being exposed to air or when an external power supply is available.

In this embodiment, the electrical energy storage apparatus 100 comprises a first energy storage device 130 and a second energy storage device 140. The first energy storage device 130 is arranged to electrically connect to an external load 150 to supply electrical energy thereto. The first energy storage device 130 is further electrically connected to the second energy storage device 140 such that the device 140 may be used to recharge the device 130 when at least a portion of the device 140 is exposed to air.

The first energy storage device 130 may be of any form that can capture energy produced at one time for use at a later time. In one example, the first energy storage device may be a battery, particularly a rechargeable battery. In another example, the first energy storage device may be a capacitor, particularly a supercapacitor. The first energy storage device may be used to supply energy to different wearable electronic devices such as smart watches, heart beat counters, pulse beat counters and the like.

Regardless of the form of the first energy storage device 130, the device comprises an anode 102 and a cathode 104 being spaced apart from each other and a second electrolyte 106 disposed between the anode 102 and the cathode 104. The second electrolyte 106 is sandwiched between and is electrically coupled with the anode 102 and the cathode 104. The anode 104 and the cathode 106 may be electrically connected to an anode 112 and a cathode 114 of the second energy storage device 140 so as to receive the electrical energy therefrom when it is available.

Optionally or additionally, the first energy storage 130 may also include substrates 108, 110 which may provide mechanical supports to the anode and/or the cathode electrodes 102, 104. The substrates may also operate as a current collector to associate with the anode 102 and the cathode 104 respectively. For example, the substrates may be electrically conductive and may be bonded to external electrical wires to deliver electrical energy to external electronic devices. The substrates may be made of any suitable conductive materials or of the same material as the electrodes. Preferably, the substrates may be of certain elasticity thereby enhancing the overall flexibility of the device.

The first energy storage device 130 may optionally include an encapsulation 116 that receives and encases the anode 102, the cathode 104 and the second electrolyte 106. The encapsulation 116 may be formed in any suitable shape such as a cylinder or a planar shape or any other suitable shape. The encapsulation 116 may be formed from a suitable material such as epoxy or a polymer.

The second electrolyte 106 may be of any suitable form such as an aqueous form, a solid form, or a gel-based form, depending on the nature of the first energy storage device 130. Preferably, the second electrolyte 106 includes a second hydrogel that is viscous enough to be formed into a shape and retain the shape it is formed into. For example, the electrolyte may be formed into any one of an elongated shape, a planar shape, a tubular shape, or any suitable shape. The second electrolyte 106 is also capable of being retained within the energy storage device 130 by being sandwiched between the electrodes 102 and 104. In other words, the electrodes 102 and 104 are disposed on opposite sides of the electrolyte 106.

As mentioned above, the first energy storage device 130 may be electrically connected to the anode 112 and the cathode 114 of the second energy storage device 140 so as to receive the electrical energy and being recharged therefrom when at least a portion of the device 140 is exposed to air.

The second energy storage device 140 may or may not have a similar form or structure to the first energy storage device 130. In other words, the second energy storage device 140 may have the same or may have different anode, cathode, and/or electrolyte as the first energy storage device 130. In this embodiment, the second energy storage device 140 comprises a similar structure to the first energy storage device 130, including a first electrolyte 118 being sandwiched by two electrodes, the anode 112 and the cathode 114 (FIG. 1A). The device 140, particularly the cathode of device 140 may also include an active material that can catalyse the reaction with air so as to harvest chemical energy from such reaction and convert the chemical energy to electrical energy being supplied to the first energy storage device 130.

Optionally or additionally, the anode 112 and/or the cathode 114 may be supported by substrates 120 and 122, respectively. The substrates 120, 122 may or may not have the same composition as the substrates 108, 110. In this example, the substrates 120, 122 may also operate as a current collector to associate with the anode 112 and/or the cathode 114 respectively.

Additionally, the second energy storage device 140 may also include an encapsulation 124 that receives and encases the anode 112, the cathode 114 and the first electrolyte 118. The encapsulation 124 may be formed in any suitable shape such as a cylinder or a planar shape or any other suitable shape. The encapsulation. 124 may be formed from a suitable material. In particular, the encapsulation 124 may be made of any materials that is arranged to selectively block the second energy storage 140 from air exposure so as to maintain the device 140 in an idle state.

In one example, the encapsulation 124 may be an air tight material that is at least partially removable from the second energy storage device 140 so as to selectively expose the cathode 114 of the second energy storage device 140 to air. Preferably, the encapsulation may be fully removed from or fully covered on the cathode 114 of the second energy storage device 140 so as to activate the device 140 for charging or maintain the device 140 in the idle state.

In particular, when the encapsulation 124 is at least partially removed from the second energy storage device 140, the active material on the cathode of the second energy storage device is exposed to and contact with air, thereby carrying out a series of chemical reactions to generate electrical charges to recharge the first energy storage device 130. When the encapsulation 124 is fully covered back to the cathode of the device, the active material is sealed from air exposure and therefore the chemical reactions are halted and the device 140 resumes to the idle state. Preferably, it is appreciated that the same encapsulation may be removed from and covered on the device 140 repeatedly.

Preferably, the encapsulation may be implemented as a sealing tape that fully covers the cathode of the second energy storage device. In particular, the cathode 114 may include an active material that can catalyse the reaction with oxygen in air, to generate electrical charges for recharging the first energy storage device. When the sealing tape is fully removed from the cathode 114, the active material contacts with oxygen in air, thereby a series of redox reactions is carried out at the cathode 114 and the anode 112 of the second energy storage device 140 to generate electrical charges for recharging the first energy storage device 130. When the sealing tape is fully covered back to the cathode 114, the active material is sealed from air exposure and therefore the chemical reactions are halted and the device 140 resumes to the idle state.

The first electrolyte 118 may or may not be the same as the second electrolyte 106, depending on the form, usage purpose, etc. of the second energy storage device 140. Preferably, the first electrolyte 118 includes a first hydrogel that is viscous enough to be formed into a shape and retain the shape it is formed into. For example, the first electrolyte 118 may be formed into any one of an elongated shape, a planar shape, a tubular shape, or any suitable shape. The first electrolyte 118 is also capable of being retained within the second energy storage device 140 by being sandwiched between the electrodes 112 and 114. In other words, the electrodes 112 and 114 are disposed on opposite sides of the electrolyte 118.

As shown in FIG. 1A, the first and the second energy storage devices are electrically connected with each other by for example physical wires such that any electrical energy in terms of electrical charges generated by the second energy storage device 140 is transferred to the first energy storage device 130 through the wires. Alternatively, the first and the second energy storage devices may be electrically connected with each other by a conductive intermediate substrate or by a common anode and a common cathode as discussed below.

Figure 1B:
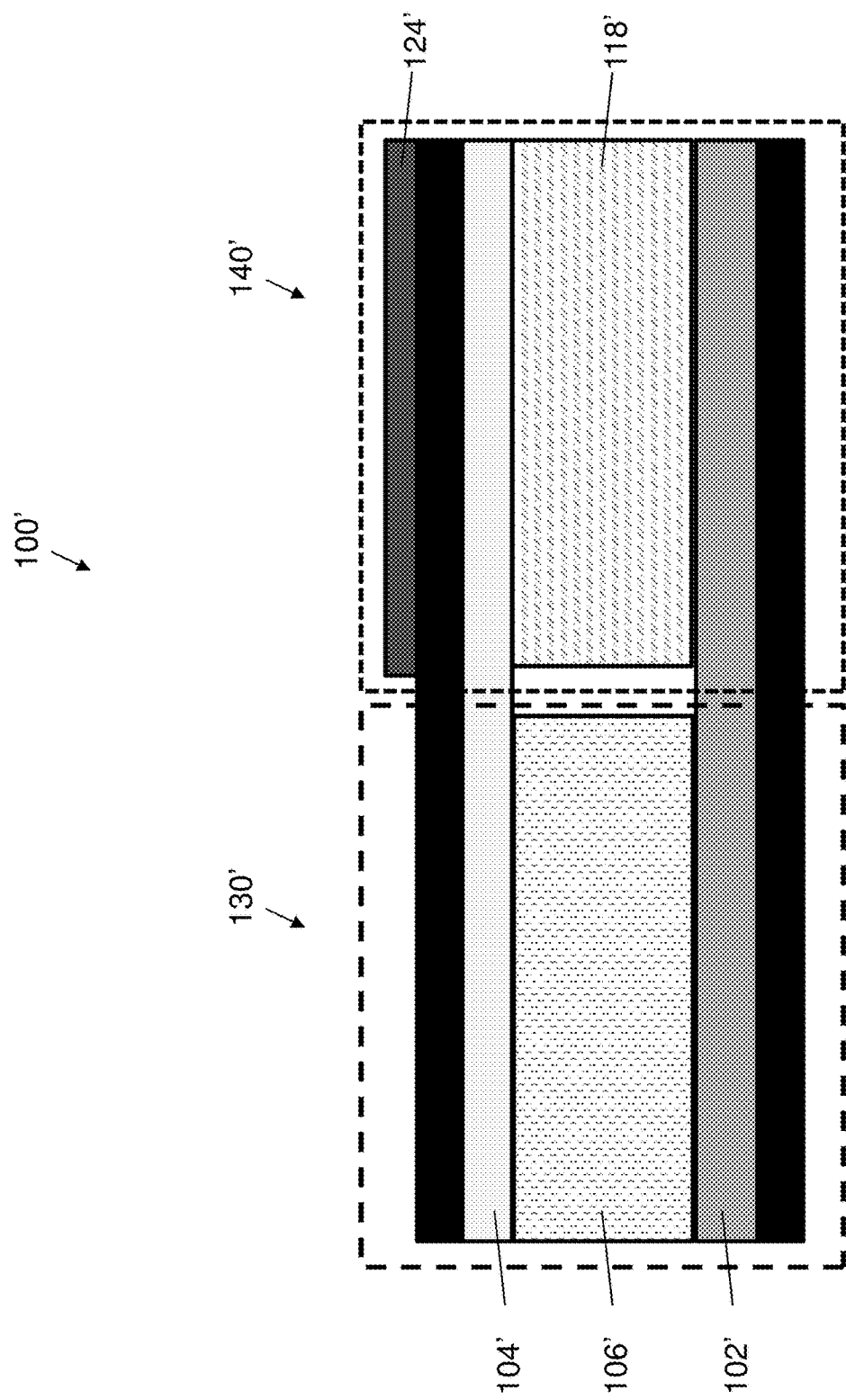
FIG. 1B illustrates of an electrical energy storage apparatus in accordance with another embodiment of the present invention.

With reference to FIG. 1B, there is provided a further exemplary embodiment of the present invention. The electrical energy storage apparatus 100' comprises a first energy storage device 130' and a second energy storage device 140' that are electrically connected with each other by a common anode 102' and a common cathode 104'. The anode 102' and the cathode 104' sandwich an electrolyte 106' (i.e the second electrolyte) and an electrolyte 118' (i.e the first electrolyte) defining the first and the second energy storage devices, respectively.

Optionally or additionally, the common anode 102' and/or the common cathode 104' may include substrates 108' and 110' which may provide mechanical supports to the anode 102' and/or the cathode 104'.

Additionally, the second energy storage device 140' includes an encapsulation 124' disposed on the cathode 104' of the second energy storage device 140' so as to selectively block the air exposure to the cathode of the second energy storage device 140', maintaining the device 140' in an idle state.

In this embodiment, the common anode 102' may comprise a metal or a metal compound in form of a foil or sheet. That is, the common anode 102' may not include a substrate 108'. Preferably, the common anode 102' may include a piece of flexible zinc foil or sheet. The zinc metal may be arranged in a suitable configuration based on the desired shape of the electrical energy storage apparatus 100'.

Alternatively, the anode 102' may include a substrate 108' disposed with a zinc metal. The zinc metal may be disposed on the substrate by any suitable methods. For example, the zinc metal may be electrodeposited on the substrate with a suitable operation thickness. The substrate may be of any suitable materials, preferably any suitable flexible and conductive materials. In one example, the substrate may be a carbon fiber cloth (CFC). The substrate may also be selected from carbon nanotube (CNT) paper, carbon paper or nickel foam.

The common cathode 104' may comprise at least one active material disposed on the substrate 110'. As mentioned, the active materials may catalyse the reaction of particularly oxygen in air to generate electrical charges to recharge the first energy storage device 130'. The active materials may be selected from the group consisting of porous carbon/$Co_4N$, Pt/C, $V_2O_5 \cdot xH_2O$ and their combination thereof. In one example, there may be one active material being disposed on the substrate 110'. In another example, there may be two active materials being disposed on the substrate 110'. In particular, the two active materials may be disposed on the substrate 110' in form of a mixture or each of the two active materials is disposed on each substrate 110' of the first energy storage device 130' and the second energy storage device 140'.

The substrate 110' may be of any suitable materials, preferably any suitable flexible and conductive materials. The substrate 110' may comprise a carbon fiber cloth (CFC). The CFC 110' may be modified by suitable methods prior to being disposed with the active materials so as to facilitating the catalytic reaction between the active material and oxygen and charge retention, thereby enhancing the charging properties of the second energy storage device 140'. In one example, the CFC may be subjected a series of treatments such as thermal chemical vapour deposition (CVD), solvothermal growth, etc so as to form a precursor material that possesses highly porous structures for embedding the active materials.

The encapsulation 124' of the apparatus 100' is in a form of an encapsulation layer 124' disposed on the cathode 104' of the second energy storage device 140'. The encapsulation layer 124' may be implemented as a sealing tape that fully covers the outer surface of the cathode 104' as shown in FIG. 1B. Preferably, the encapsulation layer or sealing tape 124' may be capable of being repeatedly removed from and covered onto the cathode.

When the encapsulation layer 124' is fully covered on the cathode 104' of the second energy storage device 140', there is no chemical reaction in the device 140' and therefore no electrical energy being transferred from the device 140' to the first energy storage device 130' as well as to any external electrical load connected to the apparatus 100'. The apparatus 100' may functions as if the apparatus consists of the first energy storage device, supplying electrical energy to the external electrical load.

When the encapsulation layer 124' is fully removed from the cathode 104' of the second energy storage 140', the active material of the cathode is exposed to and in contact with oxygen in air such that a series of chemical reactions, particularly redox reactions occur in the second energy storage device 140', generating electrical charges to recharge the first energy storage device 130'. For example, the active material catalyses an oxidation of oxygen from air at the cathode and a reduction of anode material such as zinc metal at the anode of the second energy storage device, generating electrical charges to recharge the first energy storage device.

In this way, the first energy storage device may be recharged at least one time for the second energy storage device when there is no external power supply is available. When the external power supply is available and is connected to one or both first and the second energy storage deices, the devices may be recharged by receiving electrical power from the supply.

It is advantageous that the first energy storage device may be recharged at anywhere with air supply by simply removing an encapsulation layer from the second energy storage device. It is also advantageous when there is no external power supply is available while an instant/urgent recharge of the apparatus is required. For example, it may be particular advantageous for users who always forget to recharge their wearable electronics after daily use. When the external power source is available, both the first and the second energy storage devices may be recharged by connecting one or both of the devices to the external power source.

As mentioned, the common anode 102' and the common cathode 104' may be made of flexible and conductive materials. As such, the apparatus 100' may be foldable to form an apparatus with a more compact size. For example, the apparatus 100' may be folded such that the second energy storage device 140' is stacked on the first energy storage device 130'. That is, the common anode 102' is sandwiched between the first electrolyte 118' and the second electrolyte 106', whereas this sandwiched structure is further sandwiched by the common cathode 104'. This configuration may be advantageous in view of easy storage and portability.

The first electrolyte 118' and the second electrolyte 106' may be a semi-solid state or a solid-state electrolyte. Preferably, the electrolytes 118', 106' are hydrogel electrolytes with certain flexibility. As such, in combination with the flexible common anode 102' and the common cathode 104', the whole structure of the apparatus 100' may be highly flexible, which may in turn allowing the apparatus 100' to physically deform in response to external mechanical loads applied on the apparatus during daily use. In one example, the apparatus 100' may be deformed in ways of squeezing, twisting, folding, and compressing while the electrochemical performance is maintained. It is appreciated that any other suitable hydrogel electrolytes are also applicable according to the user's requirement.

Figure 1C:
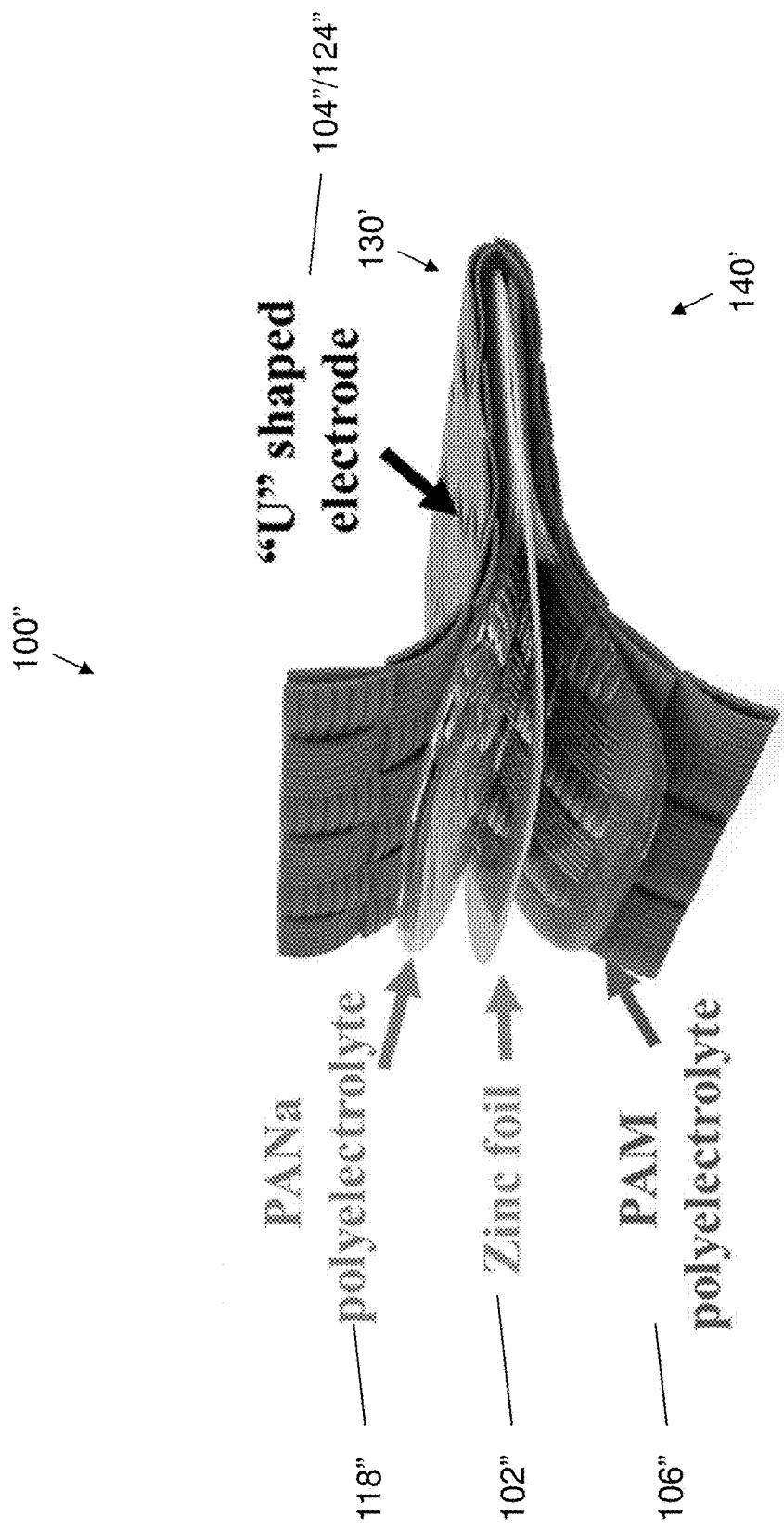
FIG. 1C illustrates of an electrical energy storage apparatus in accordance with a further embodiment of the present invention.

With reference to FIG. 1C, there is provided a further exemplary embodiment illustrating the apparatus 100' being folded to form a compact apparatus 100". The apparatus 100" comprises an anode 102" positioned at the middle of the apparatus 100", functioning as a common anode for the first energy storage device 130" and the second storage device 140". The anode 102" is sandwiched between a first electrolyte 118" and a second electrolyte 106". A cathode 104" is arranged in a "U"-shape to sandwich the first electrolyte 118", the anode 102", and the second electrolyte 106" such that a second energy storage device 140" is formed on a first energy storage device 130". In other words, the cathode 104" functions as a common cathode for both the first and the second energy storage devices. An encapsulation layer 124" may be disposed on the second energy storage device 140", fully covering its cathode (not shown) so as to selectively block the air exposure to the cathode of the second energy storage device 140", maintaining the device 140" in an idle state.

The apparatus 100" may be implemented in different forms by including different forms of the first and the second energy storage devices. In one example, the apparatus 100" may include a capacitor 130" and a battery 140". In another example, the apparatus 100" may include two batteries as the first and the second energy storage devices. Regardless of the forms of the first and the second energy storage devices, they may include a common anode such as a zinc foil, a common cathode including at least one active material disposed on a substrate, and two different hydrogel electrolytes. The active material may be selected based on the forms of the first and the second energy devices. In one example, by simply replacing the active material from one material to two materials, the apparatus 100" may be switched from a battery-capacitor configuration to a battery-battery configuration.

In this embodiment, the apparatus 100" comprises a zinc-ion capacitor 130" as the first energy storage device and a zinc-air battery as the second energy storage device 140". The zinc-ion capacitor 130" and the zinc-air battery 140" include a zinc foil as a common anode 102" and a "U" shaped cathode 104" made from porous carbon. (PC)/$Co_4N$ immobilized carbon fiber cloth. (CFC) (CFC@PC/$Co_4N$). The "U"-shaped cathode functions dually as a cathode for the zinc-ion capacitor 130" as well as an air electrode for the zinc-air battery 140". The zinc-ion capacitor 130" and the zinc-air battery 140" also include a polyacrylamide (PAM) hydrogel containing $ZzSO_4$ and a sodium polyacrylate hydrogel containing potassium hydroxide and zinc (II) acetate as the electrolyte 106" and the electrolyte 118", respectively. In addition, the zinc-air battery 140" includes a sealing tape disposed on the cathode of the battery 140" functioning as the encapsulation layer 124" (not shown).

The apparatus 100" may work at three modes of operation. Under normal circumstances, with the presence of the sealing tape 124", the active material (i.e. PC/$Co_4N$) on the cathode of the zinc-air battery 140" is sealed from air. As such, when an external electrical load is connected to the apparatus 100", only the zinc-ion capacitor 130" operates and supply electrical energy to the external electrical load. The zinc-ion capacitor 130" of the present disclosure is advantageous in that the capacitor may have a rapid kinetics of electrochemical reactions thereby a fast energy storage as a result of the high ion diffusion of hydrogel electrolyte, and the porous structure and excellent electrical conductivity of the CFC cathode. The capacitor may also maintain constant capacity over for example 20000 cycles at a predetermined current density.

Figure 2:
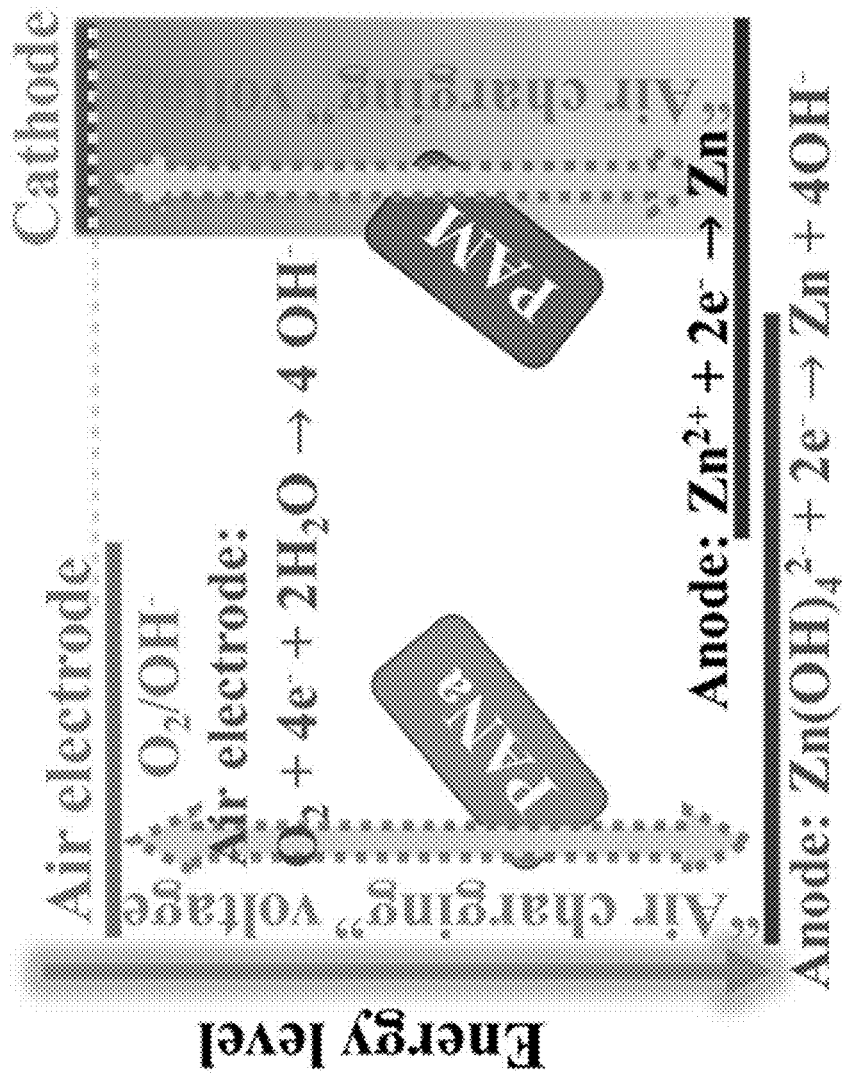
FIG. 2 is an energy diagram of the electrical energy storage apparatus of FIG. 1C.

When the sealing tape is fully removed from the cathode of the zinc-air battery 140", the apparatus 100" is turned into a "self-charging" mode. The zinc-air battery 140" is activated to recharge the zinc-ion capacitor 130". In particular, when the sealing tape is removed, the cathode of the zinc-air battery (i.e air electrode) is exposed to air and a series of redox reactions is carried out in the zinc-air battery. For example, referring to the energy level diagram as shown in FIG. 2, when the air electrode is exposed to air, an oxidation reaction of $O_2+4e^-\rightarrow 4OH^-$ that is catalyzed by the active material $PC/Co_4N$ occurs at the air electrode whereas a reduction reaction of $Zn+4OH^-\rightarrow Zn(OH)_4^{2-}+2e^-$ occurs at the zinc anode of the zinc-air battery. This in turn leads to a higher potential of the "U"-shaped electrode and a lower potential of the zinc metal electrode.

The voltage gap may drive ions adsorption on the cathode and $Zn^{2+}$ deposition on the anode of the zinc-ion capacitor 130", respectively. In this example, the charged voltage is equal to the potential gap between the oxidation and reduction reactions, which is about 1.66 V, when the air electrode is exposed to air atmosphere. Thus, the zinc-ion capacitor 130" could be fully charged by the zinc-air battery 140" with air. The "air-charging" process may be paused or stopped at any time when the sealing tape is fully covered back to the cathode of the zinc-air battery 140", thereby isolating the active material from air exposure and terminating the aforementioned reactions.

Although it is advantageous that the "self-charging" process provides a convenient way to increase the operation lifetime of the zinc-ion capacitor 130", the charging process consumes metallic zinc during working. The consumption of metallic zinc electrode may be recovered when an external power supply is available. For example, when the external power supply is available and connected to the apparatus 100", the consumed metallic zinc may be recovered by the chemical reaction of $Zn(OH)_4^{2-}+2e^-\rightarrow Zn+4OH^-$ (i.e the reverse of the reduction reaction of $Zn+4OH^-\rightarrow Zn(OH)_4^{2-}+2e^-$ during the "air-charging process"). At the same time, the zinc-ion capacitor is also fully charged with a recovery of metallic zinc by the reaction of $Zn^{2+}+2e^-\rightarrow Zn$ when the external power supply is available. Thus, the whole system (i.e apparatus 100") is recovered in the presence of an external power source.

As mentioned, the apparatus 100" may be switched from a battery-capacitor configuration to a battery-battery configuration by simply replacing the active material from one material to two materials in an alternative example, the apparatus 100" may include Pt/C as the active material for the zinc-ion battery 140" and $V_2O_5 \cdot xH_2O$ as the active material for the zinc-vanadium battery 130". In this way, a user may vary the form of the apparatus according to the application requirement in particular, the zinc-vanadium battery may be fabricated with a size of a standard mobile phone and may be fully recharged by air in one hour.

The fabrication of apparatus 100" is simple and comprises a few steps, including the steps of providing a first energy storage de vice arranged to supply electrical energy to an external electrical load; providing a second energy storage device arranged to recharge the first energy storage when at least a portion of the second energy storage device is exposed to air; and encapsulating the second energy storage device using a removable encapsulation; wherein the removable encapsulation is arranged to selectively block an air exposure to the second energy storage device, so as to maintain the second energy storage device in an idle state.

The fabrication may commence by providing an anode, particularly a common anode for both the first energy storage device and the second energy storage device. The anode may be made of any suitable conductive materials such as metals, conductive polymer, etc. Preferably, the anode is zinc metal, particularly a zinc foil.

After obtaining the anode, the fabrication may proceed to forming a first cathode for the second energy storage device and a second cathode for the first energy storage device. The cathode may be formed any suitable methods. Preferably, the first and/or the second cathode may be formed by disposing at least one active material on a substrate. Additionally, the first and the second cathodes may be combined to form a common cathode by disposing the active material on the same substrate.

The active material may be disposed on the substrate any suitable chemical and/or physical treatments. Optionally or additionally, the substrate may be modified to form a precursor material prior to being disposed with the active material. The modifying steps may include depositing graphene on the substrate by thermal chemical vapor deposition; growing a metal-organic coordination compound on the substrate to form a precursor; and subjecting the precursor to a pyrolysis process at a predetermined temperature.

Figure 3:
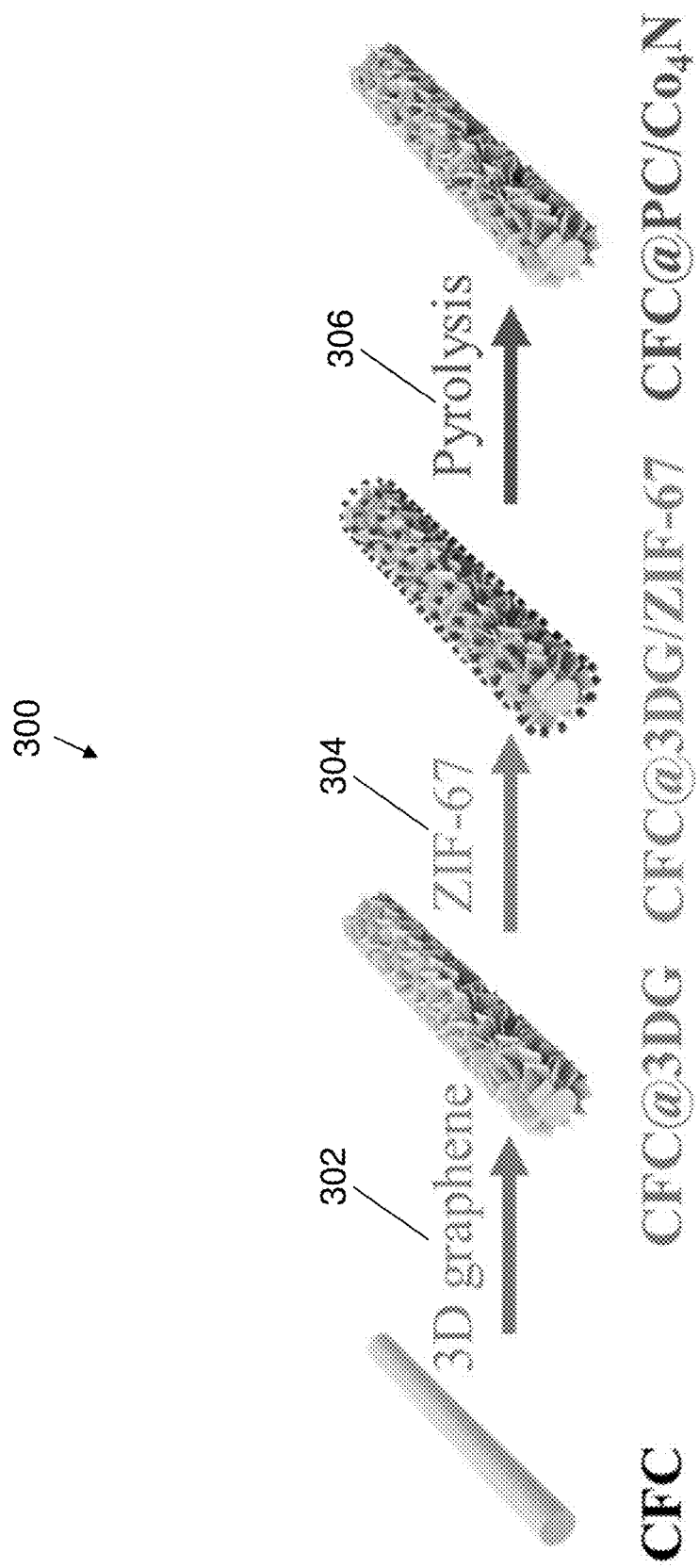
FIG. 3 is a schematic diagram showing the synthetic process of CFC@PC/$Co_4N$.

In one example, the common cathode may be an electrode of $CFC@PC/Co_4N$. The $CFC@PC/Co_4N$ cathode may be prepared by disposing the active material $PC/Co_4N$ on a modified. CFC substrate. As shown in FIG. 3, there is provided a method 300 for forming the $CFC@PC/Co_4N$ cathode. The method 300 may commence at step 302 which involves depositing a 3D graphene (3DG) on the CFC by thermal chemical vapor deposition (CV)), forming a composite of CFC@3DG.

Specifically, a layer of polyacrylonitrile (PAN) was coated on the surface of carbon fiber by soaking in PAN/DMF (3%) solution for 20 min and drying at room temperature. After that, the coated carbon fiber cloth. (CFC) was stabilized in air at 250° C. for 2 h and carbonized at $NH_3$ atmosphere at 900-1200° C. with a flow rate of 200 mL·min$^{-1}$ for 2 h. Then, the $NH_3$ flow was closed and $CH_4/H_2$ (1:10 (V:V)) flow was introduced to in situ grow 3DG. When the process of 3DG growth was finished, the Ar flow was introduced and $CH_4/H_2$ flow was closed. The tube furnace cools down naturally in Ar atmosphere.

At step 304, the CFC@3DG obtained in step 302 may be arranged to grow a metal-organic coordination compound on the substrate to form a precursor. The metal-organic coordination compound may be a zeoiitic imidazolate framework (ZIF) with a metal center selected from the group consisting or tetrahedraliy-coordinated transition metal, such as Fe, Co, Cu, and Zn. Preferably, the metal center is Co. The growing process may be performed by a soivothermal reaction.

Specifically, the precursor material may be prepared by first treating the CFC@3DG with concentrated nitric acid for 24 h at room temperature. Then it is immersed and washed by DI water for several times until the pH≈7. As a result, the CFC@3DG is functionalized by oxidized carboxylic groups on their surface, which facilitate in-situ growth of ZIF-67 polyhedrons.

To grow the GIF-67 polyhedrons on the functionalized CFC@3DG, 0.117 g of $Co(NO_3)_2 \cdot 6H_2O$ was dissolved in 10 ml of methanol under vigorously stirring at room temperature, forming a solution A. 0.325 g of 2-methylimidazole was dissolved in 10 ml of methanol under vigorously stirring at room temperature, forming a solution B. Then, the solution B was rapidly poured into solution A with constant stirring to form a mixed precursor solution. After that, the precursor solution was added into 25 mL of Teflon-line autoclave and one piece of CFC@3DG was immersed into the solution. The CFC@3DG@ZIF-67 was obtained after the autoclave was heated to 90° C. for 6 h. After solvothermal reaction, the precursor material CFC@3DG@ZIF-67 was washed with methanol for three times and dried at 60° C., for 12 h under vacuum condition.

Finally, at step 306, the as-obtained precursor material is subjected to a pyrolysis process at a predetermined temperature such as 700° C. to convert the metal-organic coordination compound into active material.

Specifically, the precursor material CFC@3DG@ZIF-67 was calcinated at 700° C. for 5 h under nitrogen atmosphere to obtain CFC@PC/Co$_4$N. Then, the pyrolyzed products were treated using 0.5 M H$_2$SO$_4$ at 50° C. overnight to remove excess Co nanoparticles. At this stage, the cathode CFC@PC/Co$_4$N is obtained.

Alternatively, the common cathode may include the first cathode of the second energy storage device and the second cathode of the first energy storage device. The first and the second cathodes may be prepared by disposing a slurry of at least one active material on a common substrate. The as-formed cathode may therefore include more than one active materials disposed on the common substrate, which is particularly useful when the apparatus 100" comprising a first energy storage device 130" and a second energy storage device 140" that requires different cathode requirements.

In one example, the first electrode may be an air electrode of Pt/C on CFC whereas the second electrode may be a V$_2$O$_5$.xH$_2$O electrode. The first electrode may be prepared by first forming a slurry of Pt/C electrocatalyst (i.e active material), followed by disposing the slurry on CFC. In particular, the slurry may be prepared by dispersing 8 mg of Pt/C electrocatalyst into 1 mL of mixture solution of 2-propanol, distilled water, and Nafion solution (5 wt %) (10:40: 1). The slurry may then be casted on a CFC and dried at a pre-determined temperature to obtain the Pt/C on CFC electrode.

The second cathode may be prepared by dissolving 0.712 mg of V$_2$O$_5$ in a mixture solution of 60 mL DI water and 4 mL acetic acid to obtain the V$_2$O$_5$.xH$_2$O electrode material. The as-formed homogenous solution was then transferred into a 100 Teflon-lined autoclave, which was heat up to 200° C. in oven and maintained at 200° C., for 72 h. After cooling down to room temperature, the materials were collected and rinsed with ethanol and water and dried in a vacuum at 50° C. for 6 h.

The as-prepared active material V$_2$O$_5$.xH$_2$O was then mixed with acetylene black and PVDF with a ratio of 7:2:1 by NMP to form a slurry. The slurry may then be casted on a CFC and dried at 40° C., forming an V$_2$O$_5$.xH$_2$O electrode with 11.5 mg·cm$^{-2}$ V$_2$O$_5$.xH$_2$O.

The formation of the first and the second electrolyte may commence at the step of forming a mixture of a first gel monomer such as acrylic acid monomer or a second gel monomer such as acrylamide with an initiator and a crosslinking agent. The step may further include a step of mixing the first gel monomer with an alkaline solution in this way, the first gel monomer such as acrylic acid may be neutralized to form sodium acrylate monomer.

In one example, the first electrolyte is sodium polyacrylate (PANa). The mixture is formed by slowly dropping 10 mL of 10 M sodium hydroxide aqueous solution to 7.2 mL acrylic acid (AA) monomers (i.e the first gel monomer) to neutralize the AA monomers under vigorous stirring, followed by adding 110 mg of ammonium persulfate (i.e the initiator) and 4 mg of N,N'''-methylenebis-acrylamide (MBAA) (i.e the crosslinking agent) into the neutralized solution and stirring the solution for 0.5 h at room temperature.

In another example, the second electrolyte is polyacrylamide (PAM). The mixture is obtained by dissolving 4 g of acrylamide monomer in 15 ml of distilled water under vigorous magnetic stirring at 40° C., followed by adding 2.5 mg of MBAA and 50 mg of ammonium persulfate to the solution and maintaining the solution at 40° C. for 2 h.

The mixture obtained may be cured by suitable methods such as UV light, thermal, chemical, etc. to form a hydrogel. Prior to the curing process, the mixture obtained in previous step may be degassed by suitable methods such as nitrogen, sonication, etc. Preferably, the curing process may be performed at room temperature or at a higher temperature to allow polymerization to occur.

In this example, the mixture may be degassed with nitrogen to remove any dissolved oxygen. The mixture containing the sodium acrylate monomer may be polymerized by a free-radical polymerization carried out at 70° C. for 1 h; whereas the mixture containing the acrylamide monomer may be polymerized by a free-radical polymerization carried out at 65° C. for 1 h. The as-obtained hydrogel may be dried at room temperature or at an elevated temperature (e.g. 80° C.).

Finally, the as-prepared hydrogel may be soaked into an aqueous electrolytic solution to promote ion conductivity of the electrolyte. In this example, the as-obtained PANa hydrogel may be soaked into an aqueous electrolytic solution containing 0.2 M zinc (II) acetate and 6 M potassium hydroxide for 24 h; whereas the as-obtained PAM hydrogel may be soaked into an aqueous electrolytic solution containing 2 M ZnSO$_4$ for 24 h. As such, a hydrogel electrolyte retaining a particular aqueous electrolytic solution is obtained. It is appreciated that other suitable metal compounds, acids, alkali, or their combinations may also be used.

The as-obtained anode, cathode, and electrolytes may be layered on each other to form the apparatus 100". Preferably, the second energy storage device is defined by the common cathode, the common anode and the first electrolyte sandwiched therebetween, and the first energy storage device is defined by the common cathode, the common anode and the second electrolyte sandwiched therebetween.

In one example, the apparatus 100" may be an "air-chargeable" zinc-ion capacitor. The capacitor may include a flexibly freestanding "U" shaped electrode of CFC@PC/Co$_4$N as the common cathode, a zinc-metal (zinc foil) electrode as the common anode, and two different electrolytes of PANa and PAM as the first and the second electrolytes respectively.

The zinc-air capacitor may be prepared by sandwiching the zinc foil between the two electrolytes PANa and PAM, forming a PANa-Zn-PAM sandwiched structure. This structure is further sandwiched by the flexibly freestanding "U" shaped electrode of CFC@PC/Co$_4$N.

In another example, the apparatus 100" may be an "air-chargeable" zinc-vanadium battery. The zinc-vanadium battery may have the same structure as the aforementioned zinc-ion capacitor expect that the flexibly freestanding "U" shaped electrode of CFC@PC/Co$_4$N cathode is replaced by a common cathode including the first cathode (Pt/C on CFC electrode) disposed on the PANa electrolyte and the second cathode (V$_2$O$_5$.xH$_2$O on CFC electrode) disposed on the PAM electrolyte, respectively.

The characterization and performance of embodiments of the electrical energy storage apparatus containing the first and the second energy storage devices will now be discussed. The crystal structure is characterized by a Bruker D2 Phaser X-ray diffractometer with radiation from a Cu target ($\lambda$=0.154 nm) operating at 30 kV and 10 mA, respectively. The morphology and microstructure of synthesized products are evaluated by field emission scanning electron microscopy (FESEM; JEOL JSM-6700F, 5 kV) and JEOL-2001F field-emission transmission electron microscopy (FETEM).

The electrochemical performance of the "air chargeable" zinc-ion capacitor is tested using freestanding "U"-shaped electrode of CFC@PC/Co$_4$N electrode as the positive electrode, zinc foil as the negative electrode, PAM and PANa as electrolytes, respectively. The loading mass of active materials is around 1.05 mg·cm$^{-2}$. Galvanostatic charge/discharge measurements is conducted between 0.2 and 2.0 V utilizing a land 2001A battery testing system with two-electrode configuration at room temperature. Cyclic voltammetry curves (CV) are examined using an electrochemical workstation (CHI 760D, Chenhua).

For "air-charging" function test, when the capacitor is fully discharged by Land testing system, the gas diffusion window of the air electrode is open. The rest model of Land testing system is used to record the output voltage of "air-charging" component of the present system. The current-time model of electrochemical workstation is utilized to record the output current of the "air-charging" component of the present system.

For the large-capacity "air chargeable" zinc-vanadium battery, the method of electrochemical performance test is identical to that of "air chargeable" zinc-ion capacitor. The loading mass of air electrode and cathode of zinc-vanadium battery is 1 mg·cm$^{-2}$ and 11.5 mg·cm$^{-2}$, respectively. The galvanostatic charge/discharge test is carried out between 0.2-1.6 V.

Figure 4A:
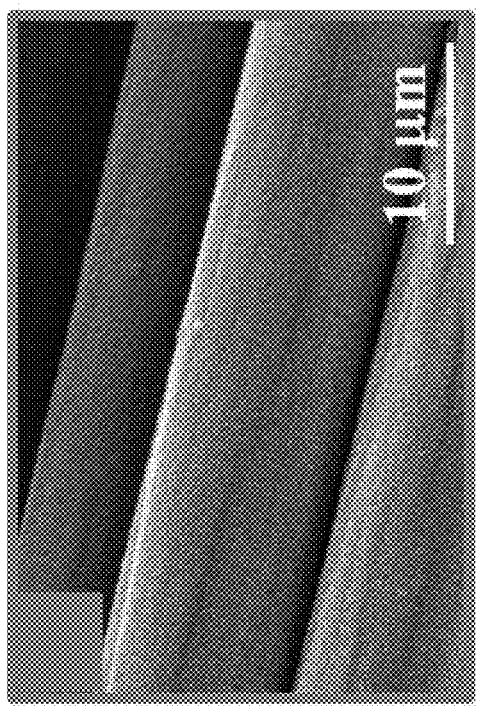
FIG. 4A is a low-magnification SEM image of CFC@3D graphene.
Figure 4B:
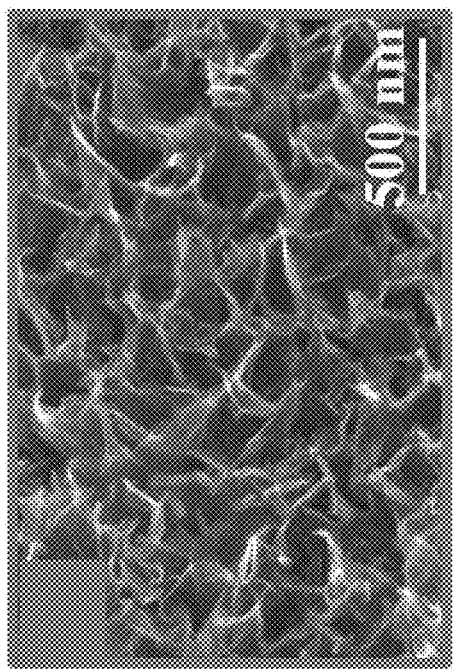
FIG. 4B is a high-magnification SEM image of CFC@3D graphene.
Figure 4C:
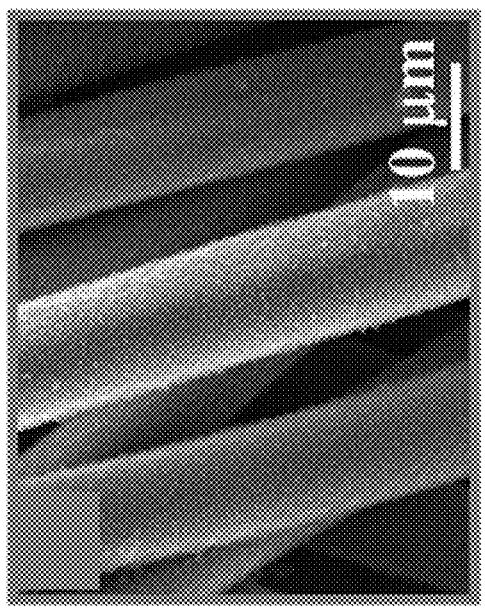
FIG. 4C is a low-magnification SEM image of CFC@3DG/ZIF-67.
Figure 4D:
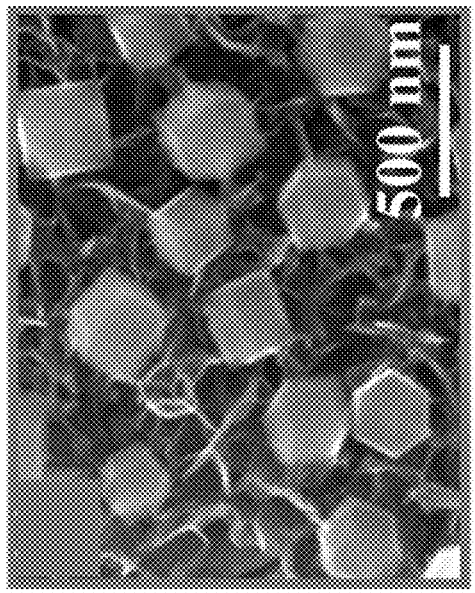
FIG. 4D is a high-magnification SEM image CFC@3DG/ZIF-67.

The morphology and structure evolution of the CFC@PC/Co$_4$N are investigated by scanning electron microscopy (SEM), transmission electron microscopy, and X-ray diffraction (XRD). As shown in FIGS. 4A and 4B, the assembly graphene nanosheets are interconnected with each other and vertically grown on CFC. The edges of vertical graphene nanosheet with bending and crumpling structure exposed on the surface, resulting in a fiber with a 3D porous network structure. This 3D porous network provides sufficient space for grafting ZIF-67 polyhedrons. As shown in FIG. 4C, the ZIF-67 polyhedrons uniformly and closely encase the fibers to form a CFC@3DG/ZIF-67 core-shell structure with the porous features well maintained (FIG. 4D).

Figure 4F:
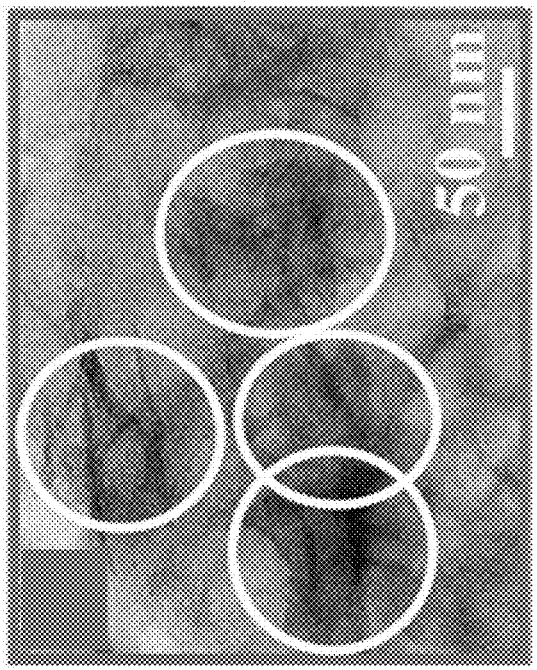
FIG. 4F is a TEM image of CFC@PC/$Co_4N$. The white circles indicate the PC/$Co_4N$ derived from ZIF-67.
Figure 4E:
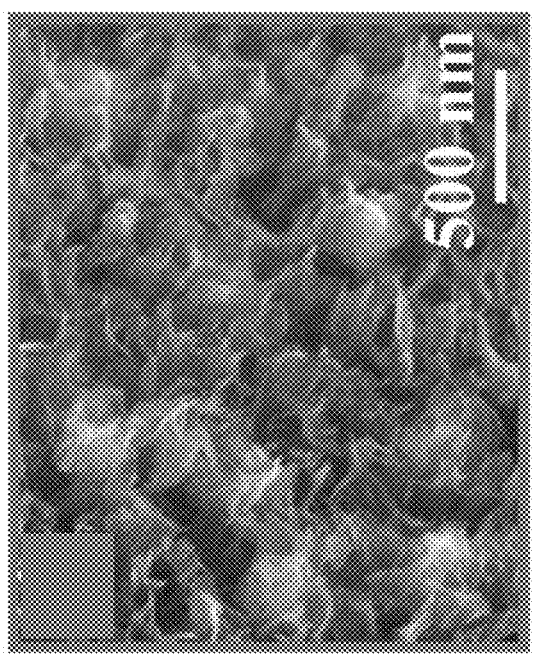
FIG. 4E is a SEM image of CFC@PC/$Co_4N$.
Figure 4G:
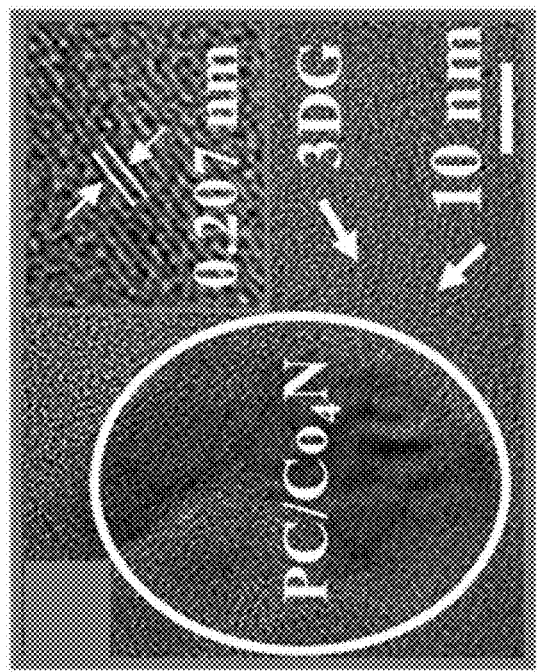
FIG. 4G is a high-magnification TEM image of CFC@PC/$Co_4N$. The insert is the high-magnification TEM image of $Co_4N$.

After the high-temperature (700° C.) pyrolysis treatment under N$_2$ or Ar atmosphere, the 3D network structure and polyhedron shape of the ZIF-67 are well retained (FIGS. 4E to 4G). Notably, during the pyrolysis process, the 3DG continues to grow under the catalysis of cobalt and the carbonized polyhedrons being wrapped by interconnected porous carbon. The ZIF-67 derived polyhedron contains abundant Co$_4$N particles, which are embedded in the porous carbon matrix of polyhedron.

Figure 5:
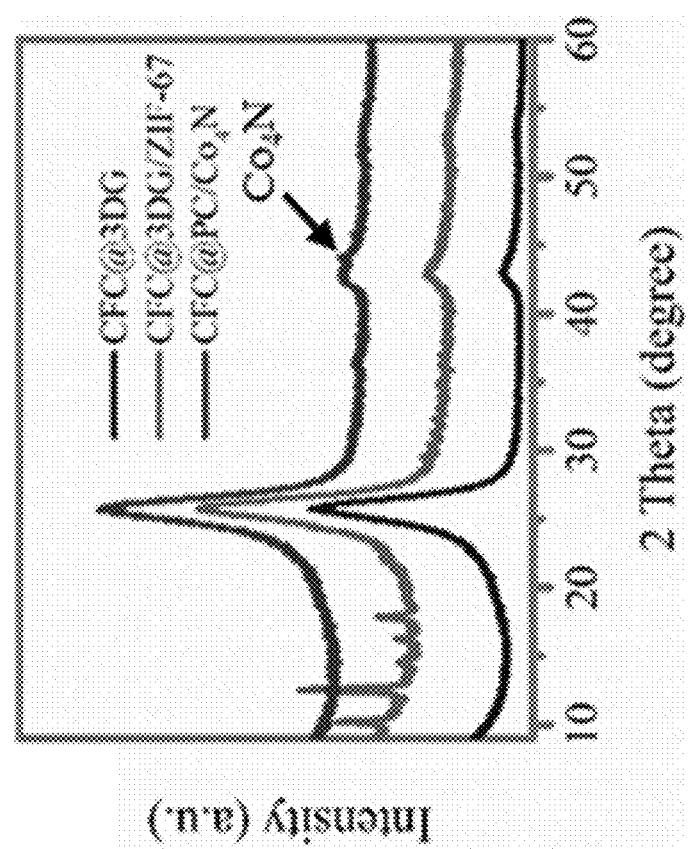
FIG. 5 is a plot showing the XRD patterns of CFC/3DG, CFC@DG/ZIF-67, and CFC@PC/$Co_4N$.

The existence of Co$_4$N was verified by the high-resolution transmission electron microscopy (HR-TEM) and the results are shown in FIG. 4G. A lattice fringe of 0.207 nm is obviously consistent with the (111) lattice plane of cubic structure of Co$_4$N (the inset of FIG. 4G). This phenomenon could be further confirmed by XRD patterns. The new small peak at 44° matches well with the cubic structure of Co$_4$N (FIG. 5).

Porous carbon/Co—N—C derived from ZIF-67 is an excellent material for cathode of zinc-ion capacitor for charge storage, and air electrode for energy conversion from air to electricity due to the porous nature and highly intrinsic electrocatalytic activity. Thus, the porous carbon fiber with Co—N—C particles embedded is highly desirable as a dual-functional material for energy storage and conversion.

The electrochemical performance of the zinc-ion capacitor component has been investigated. The zinc-ion capacitor component consists of a porous carbon with Co$_4$N embedded as the cathode, a zinc metal foil as the anode and polyacrylamide (PAM) hydrogel containing 2 M ZnSO$_4$ solution as the electrolyte.

Figure 6A:
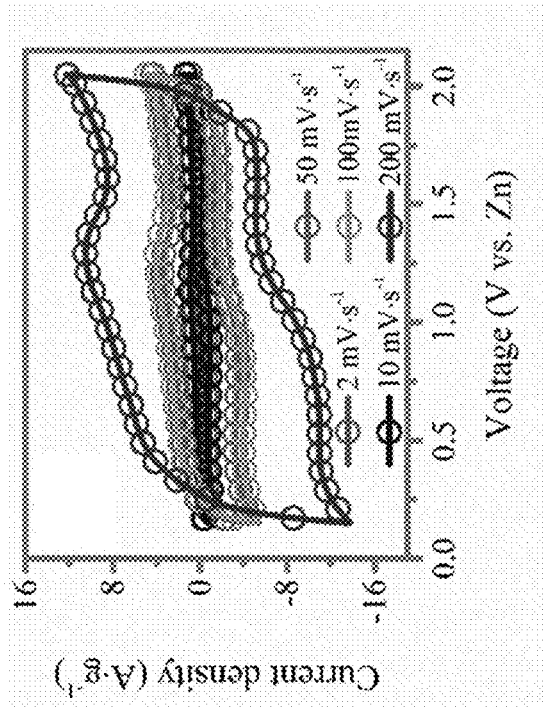
FIG. 6A is a cyclic voltammogram showing the CV curves of the zinc-ion capacitor component at different scanning rates.
Figure 6B:
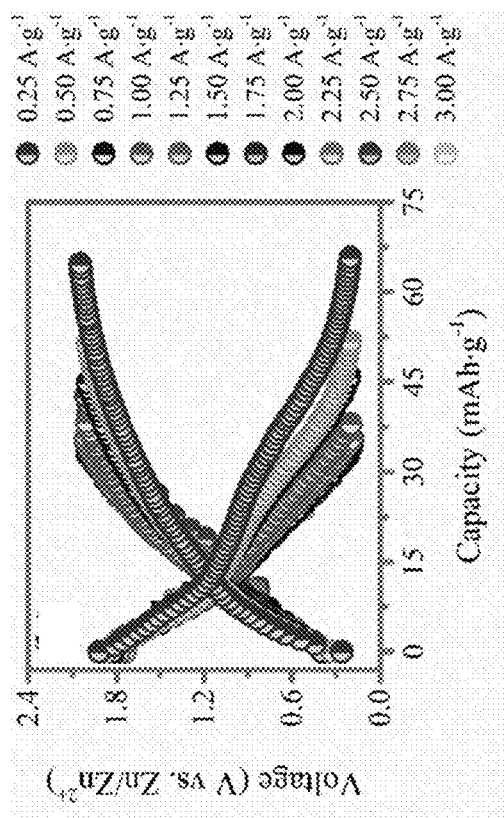
FIG. 6B is a plot of voltage against capacity showing the galvanostatic charge/discharge curves of the zinc-ion capacitor component at different current densities.

The cyclic voltammetry (CV) curves at the range of 0.1-2.0 V retain well rectangular shape even at high scan rate of 200 mV·s$^{-1}$ (FIG. 6A). The weak broad peaks at ~1.35 and ~0.85 V is due to the existence of Co$_4$N embedded in the porous carbon. It implies that rapid kinetics of the electrochemical reactions and a typical capacitive behavior. Correspondingly, the phenomenon is reflected in galvanostatic discharge/charge (GCD) curves with triangle shape as shown in FIG. 6B. It is inseparable from high ion diffusion of hydrogel electrolyte, and porous structure and excellent electrical conductivity of the fiber electrode. Thus, the zinc-ion capacitor is capable of fast energy storage.

Figure 7A:
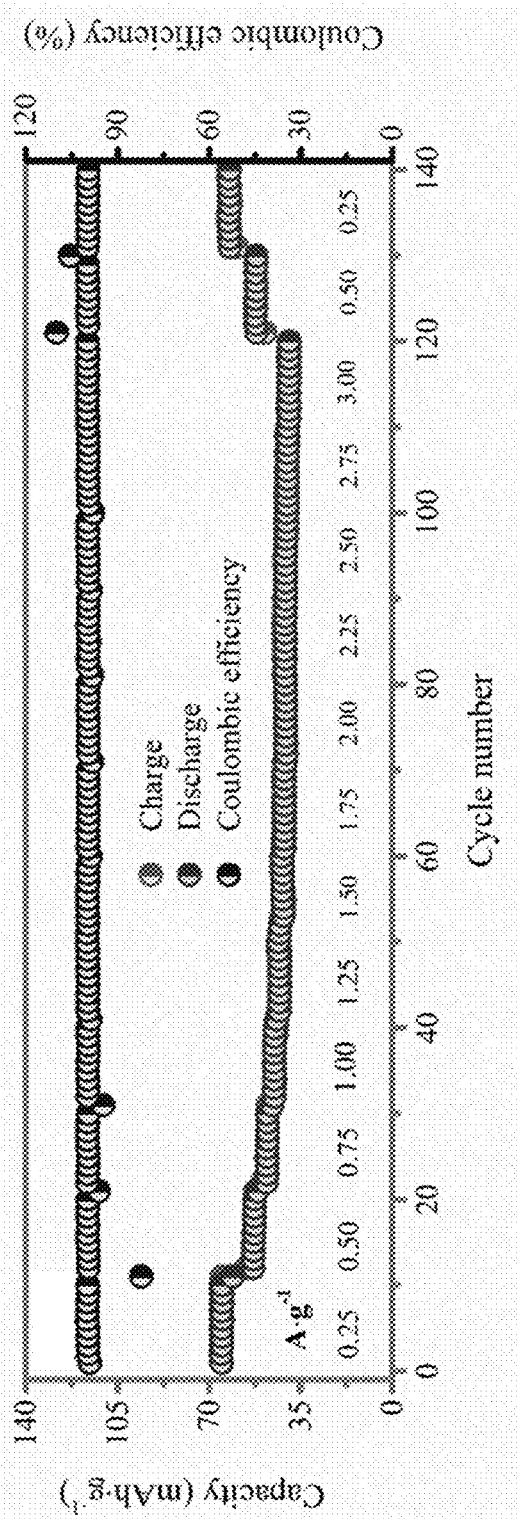
FIG. 7A is a plot of capacity against cycle number showing the rate performance of the zinc-ion capacitor component.
Figure 7B:
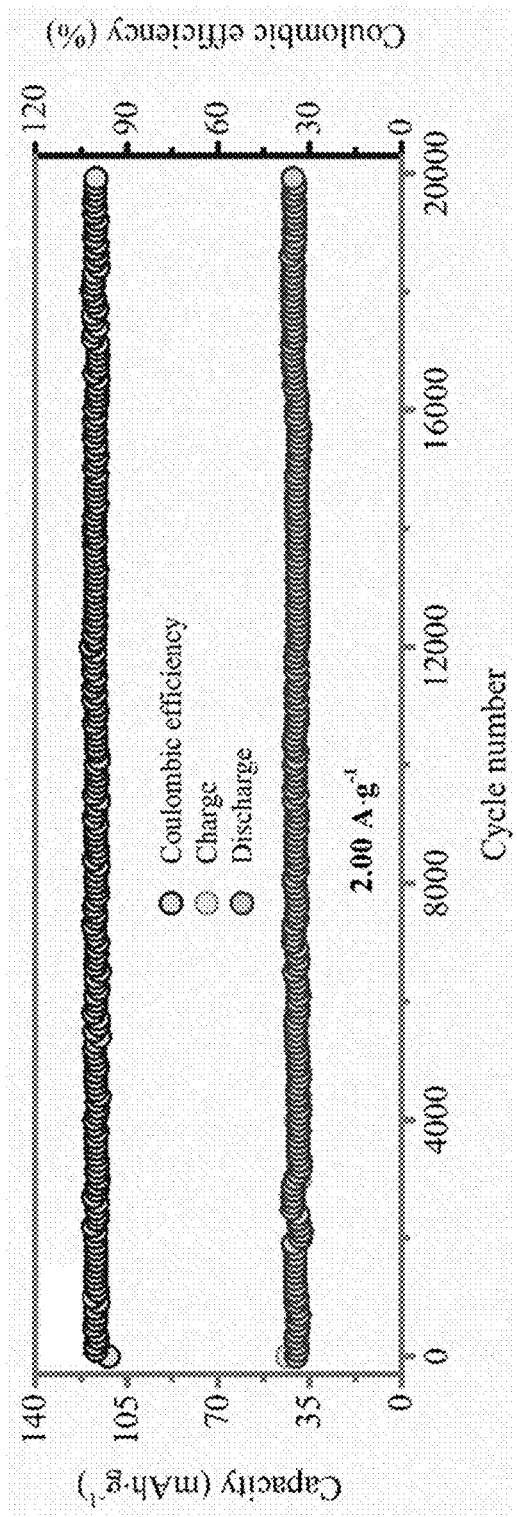
FIG. 7B is a plot of capacity against cycle number showing the cycling performance of the zinc-ion capacitor component.

As shown in FIG. 7A, the zinc-ion capacitors in the integrated systems show an excellent rate capability. The discharge capacity still retains more than 38 mAh·g$^{-1}$ at 3 A·g$^{-1}$, which is about 60% of 67 mAh·g$^{-1}$ at 0.25 A·g$^{-1}$. When the rate shifts back to 0.25 A·g$^{-1}$, the capacity recovers back to 67 mAh·g$^{-1}$. Moreover, the present apparatus exhibits remarkable cycling life-span even at high-rate of 2 A·g$^{-1}$ (FIG. 7B). The capacity maintains constant even after an overall of 20000 cycles at a current density of 2 A·g$^{-1}$, which may be the first demonstration of a rechargeable solid-state zinc-ion capacitor with such a prominent cycling lifespan.

Figure 8:
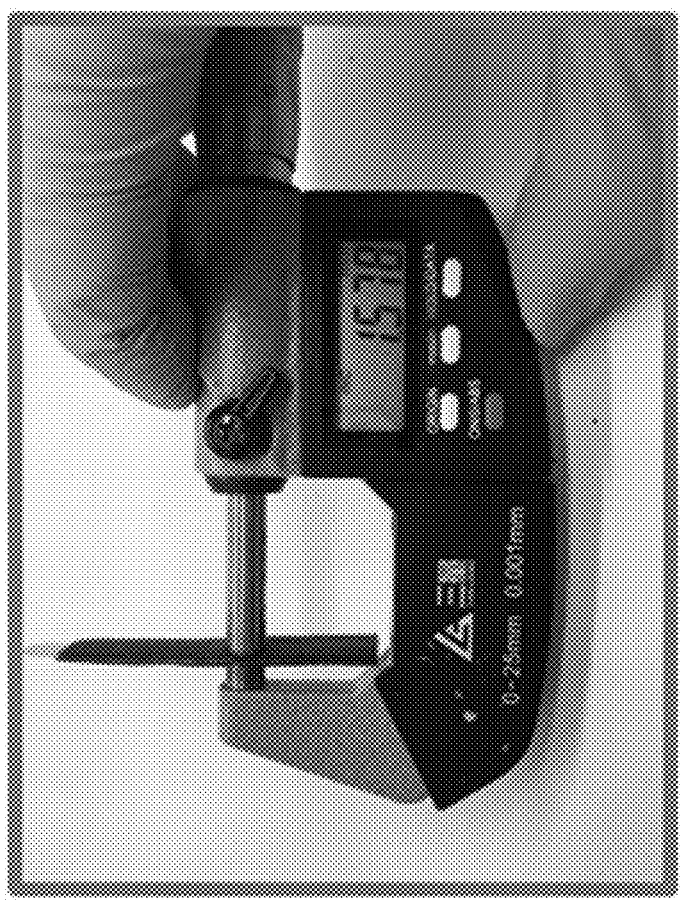
FIG. 8 is an optical image showing the thickness of the "air-chargeable" zinc-ion capacitor.

The electrochemical performance and the "air-charging" properties of the "air-chargeable" zinc-ion capacitor are investigated and the results are discussed as follows. The integrated system of "air charging" zinc-ion capacitor is constructed using the PC/Co—N—C electrode configured with a "U" shape, a metal zinc electrode positioned in the middle of the capacitor and two different hydrogel electrolytes sandwiched between the electrodes (FIG. 1C). The thickness of the apparatus is determined by a micrometer caliper. As shown in FIG. 8, the apparatus possesses a thickness of ~1.578 mm, which can feasibly be integrated into clothing textile as a wearable energy storage apparatus.

Figure 9A:
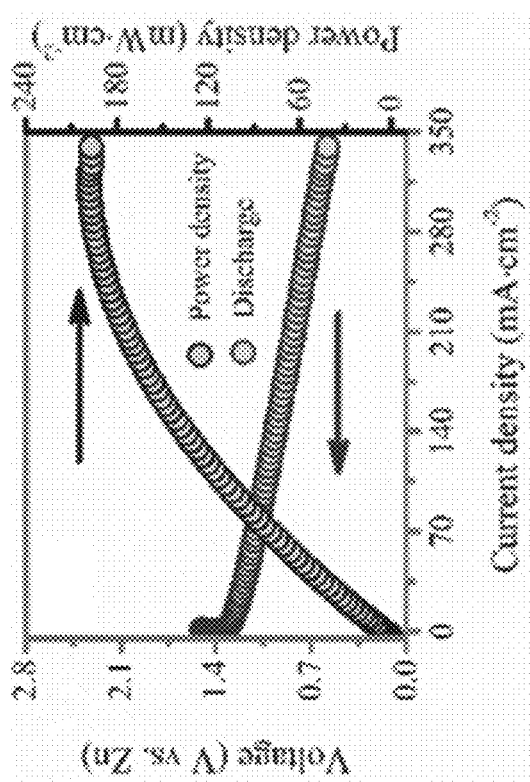
FIG. 9A is a plot of voltage against current density showing the discharging curve and corresponding power density curve of the "air-charging" component in the integrated system.

When the apparatus is exposed to air, the portion of the apparatus composed of half of the "U"-shaped electrode, the metal zinc electrode and PANa electrolyte containing 6 M KOH solution and 0.2 M Zn(CH$_3$COO)$_2$ operates as a zinc-air battery. The discharging curves and corresponding power output curves are shown in FIG. 9A. The zinc-air battery delivers an open circuit voltage of ~1.58 V, which is close to the theoretical value (1.66 V). Its power density reaches to 200.6 mW·cm$^{-2}$, suggesting that it may be able to provide a sufficient power to charge the zinc-ion capacitor at a high rate. Although the "air charging" component could provide acceptable output power density, compared with zinc-ion capacitors, its output power density is much lower and it is insufficient to meet the requirement of powering electronics.

Figure 9B:
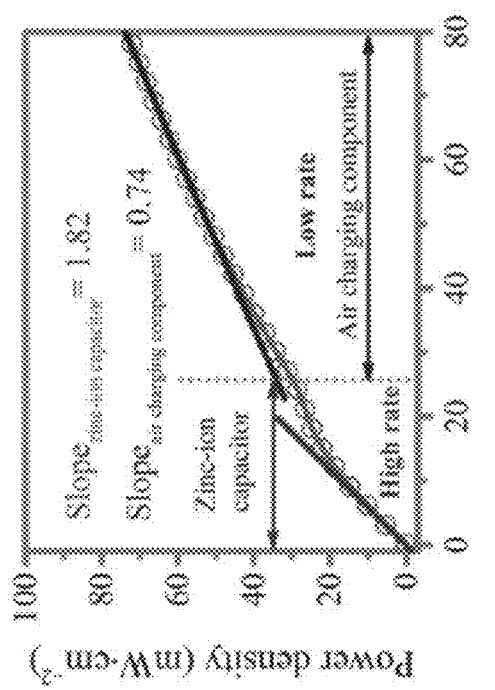
FIG. 9B is a plot of power density against current density showing the power density curve of the "air-charging" component and zinc-ion capacity galvanodynamically applying current density from 0 to 80 mA·cm$^{-2}$ using a current step of 1 mA.

As show in FIG. 9B, the zinc-ion capacitor shows significantly high rate electrochemical process (1.82 slope of power density vs current density), which derives from a rapid electrochemical kinetics. In contrast, the "air-charging" component only exhibits 0.74 slope of power density vs. current density, which is attributed to a normal sluggish process in zinc-air electrochemical process.

Figure 10A:
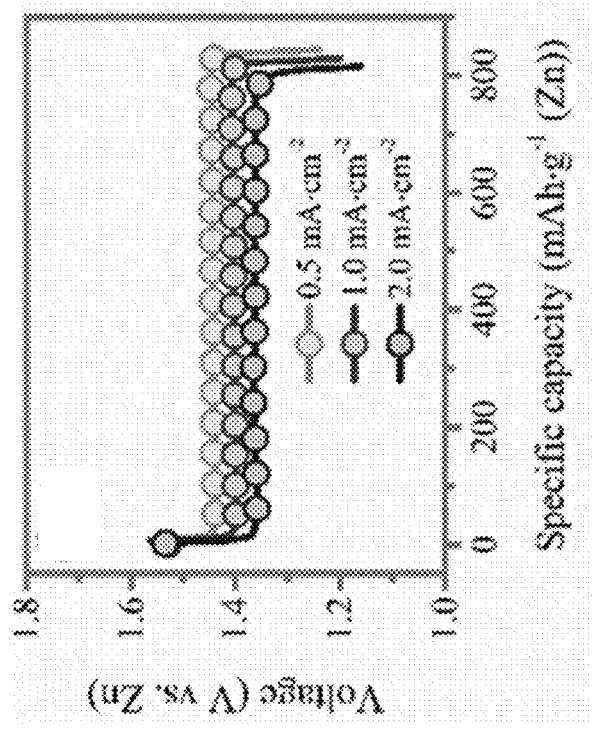
FIG. 10A is a plot of voltage against specific capacity showing the galvanostatic discharging curves of the "air-charging" component at different current densities.
Figure 10B:
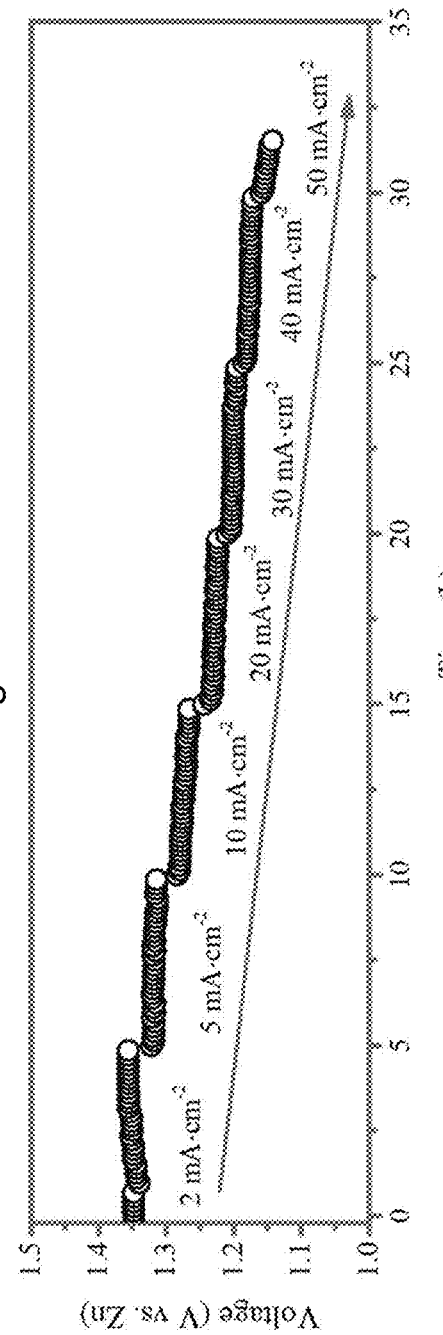
FIG. 10B is plot of voltage against time showing the galvanostatic discharging curves of the "air-charging" component at current densities from 2 to 50 mA·cm$^{-2}$.

The galvanostatic discharge curves at different current densities are shown in FIG. 10A. It is observed that the competitive discharge voltage plateau at 1.3-1.5 V at a current density of 0.5-2 mA·cm$^{-1}$. Furthermore, from the rate capability of the apparatus, their output voltage is higher than 1.15 V even at the current density of 40 mA·cm$^{-1}$ (FIG.

10B). The specific capacity of the "air-charging" portion is more than 800 mAh·g$^{-1}$, which are comparable to the reported electrode materials. The specific capacity normalized by the total mass of the air electrode and the metal zinc electrode is equivalent to the gravimetric energy density of 945 Wh·kg$^{-1}$. The high energy density could supply sufficient energy for the zinc-ion capacitors.

The "air-charging" component with a high energy density shows a low output the power density, whereas the zinc-ion capacitor with a low energy density shows a higher power density. Therefore, the "air-charging" component may be used as a backup power source in combination with the zinc-ion capacitor to achieve a high energy density and a high power density in an electrical energy storage apparatus.

Having systematically evaluated performance of both "air charging" component and zinc-ion capacitor component, the "air-charging" function of the apparatus has been investigated. The output voltage profile of "air-charging" component and galvanostatic discharge curves of zinc-ion capacitor component charged by air with different times are shown in FIGS. 11A and 11B. The output voltage increases at different rates along with the "air-charging" time. This may be accounted for by the potential difference between the air electrode and the cathode that is relatively large at the beginning of the "air-charging" process as well as the large output current of the "air-charging" component.

As the charging process proceeds, the potential difference between air electrode and the cathode decreases, resulting in a smaller output current of the "air-charging" component. Correspondingly, the output current has a decreasing trend, and the decreasing rate is also gradually reduced. This phenomenon is consistent with rate capability of the "air-charging" portion, indicating that the "air-charging" component is an effective power supply to charge the zinc-ion capacitor component.

Figure 12A:
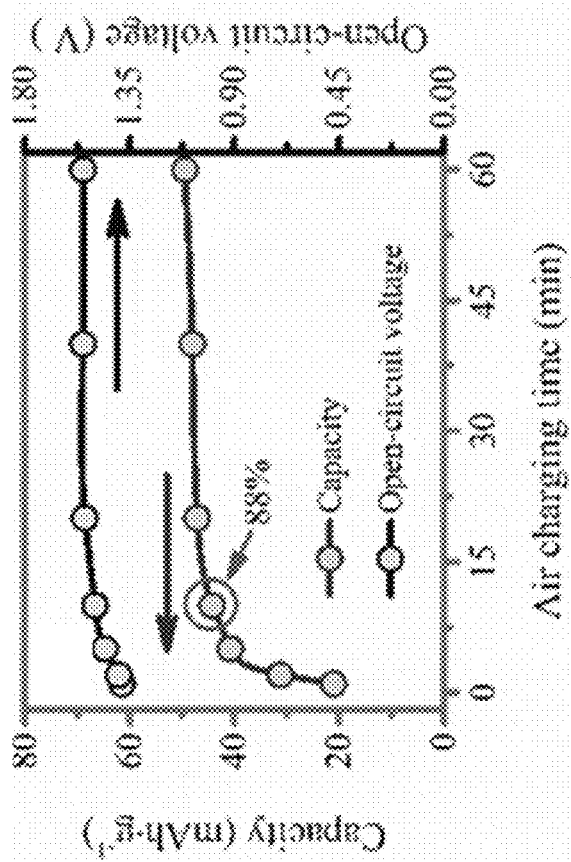
FIG. 12A is a plot of capacity against air-charging time showing the discharging curves and corresponding open-circuit voltages of the "air-charged" zinc-ion capacitor.

The galvanostatic discharge curves of the "air-charging" zinc-ion capacitor system after being charged by air for different times is shown in FIG. 11B. The typical discharge curves after being charged by air are similar to the discharge curves of the zinc-ion capacitor charged by a battery tester system (Land, China). Furthermore, the calculated discharge capacities from the discharging curves and corresponding open-circuit voltages are shown in FIG. 12A. It is observed that in the initial 10 min, the zinc-ion capacitor is quickly charged to 88% from being fully charged and the open-circuit voltage reaches to 1.49 V. After 60 min of "air-charging", the capacity of the zinc-ion capacitor reaches up to 50 mAh·g$^{-1}$ and the open-circuit reaches to 1.55 V.

Figure 12B:
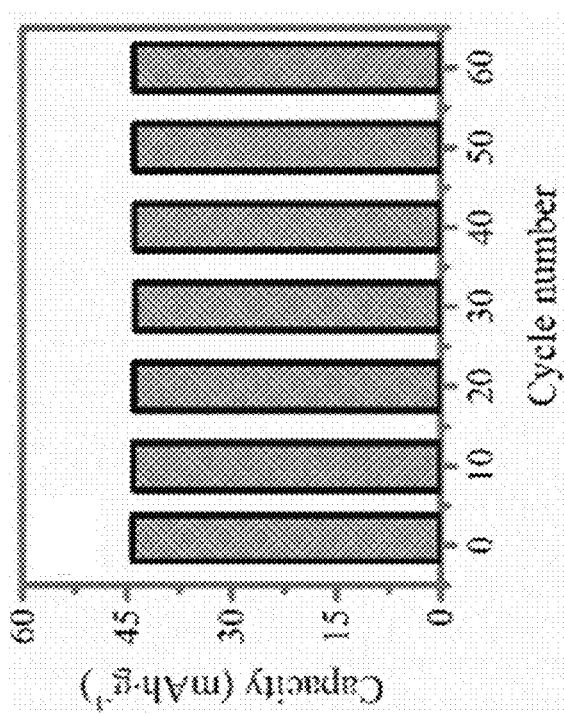
FIG. 12B is a bar chart showing the stored energy of the "air-chargeable" zinc-ion capacitor after 10 min "air-charging" process for each cycle.

The cycling stability of the "air-charging" zinc-ion capacitor system being charged by air for 10 min and discharged by Land battery tester is investigated. As shown in FIG. 12B, the "air-charging" zinc-ion capacitor delivers an initial capacity of 44.6 mAh·g$^{-1}$ at the 1st cycle and a capacity of 44.2 mAh·g$^{-1}$ at the 60th cycle after 10 min of "air-charging", suggesting the excellent stability of the apparatus and confirming the remarkable "air-charging" capabilities of the apparatus.

Although the "air-charging" process consumes metallic zinc during operation, when an external power supply is available, the consumed metal zinc can be recovered by charging the system via the chemical reaction of Zn (OH)$_4^{2-}$+2e$^-$→Zn+4OH$^-$, and at the same time the zinc-ion capacitor is also fully charged. In other words, the whole system is recovered in the presence of an external power source.

Figure 13A:
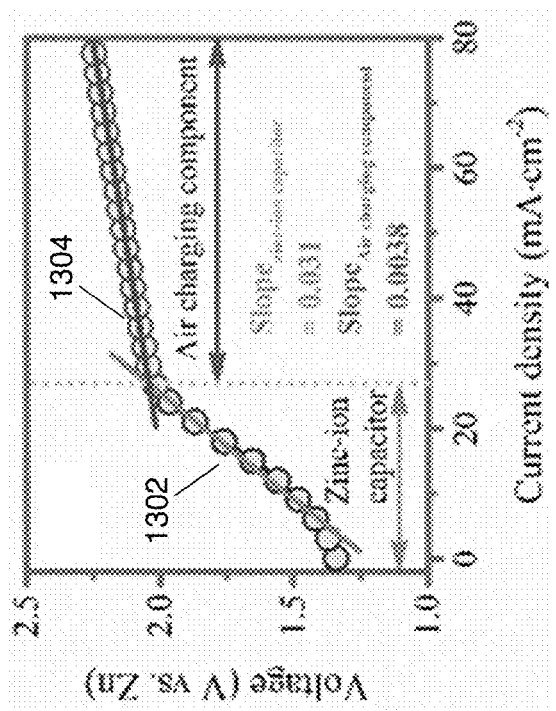
FIG. 13A is a plot of voltage against current density showing galvanodynamic charge curves of the zinc-ion capacitor and the "air-charging" component.

The galvanodynamic charge curves of the "air-chargeable" zinc-ion capacitor system at 0-80 mA·cm$^{-2}$ is shown in FIG. 13A. The charge profile exhibits a two-stage feature. The curve 1302 is assigned to the charging process (Zn$^{2+}$→metallic Zn) of the zinc-ion capacitor, whereas the obvious voltage plateau (curve 1304) at around 2.1 V is ascribed to the electrochemical reduction process of Zn (OH)$_4^{2-}$ to metallic Zn, resulting in a recovery of metallic Zn electrode in the "air-charging" component. It is obvious to note that the zinc-ion capacitor shows a significantly quick charge performance (0.031 slope of voltage vs current density), which is ten times greater than that of the "air-charging" component (0.0038 slope of power density vs current density) (FIG. 13A).

Figure 13B:
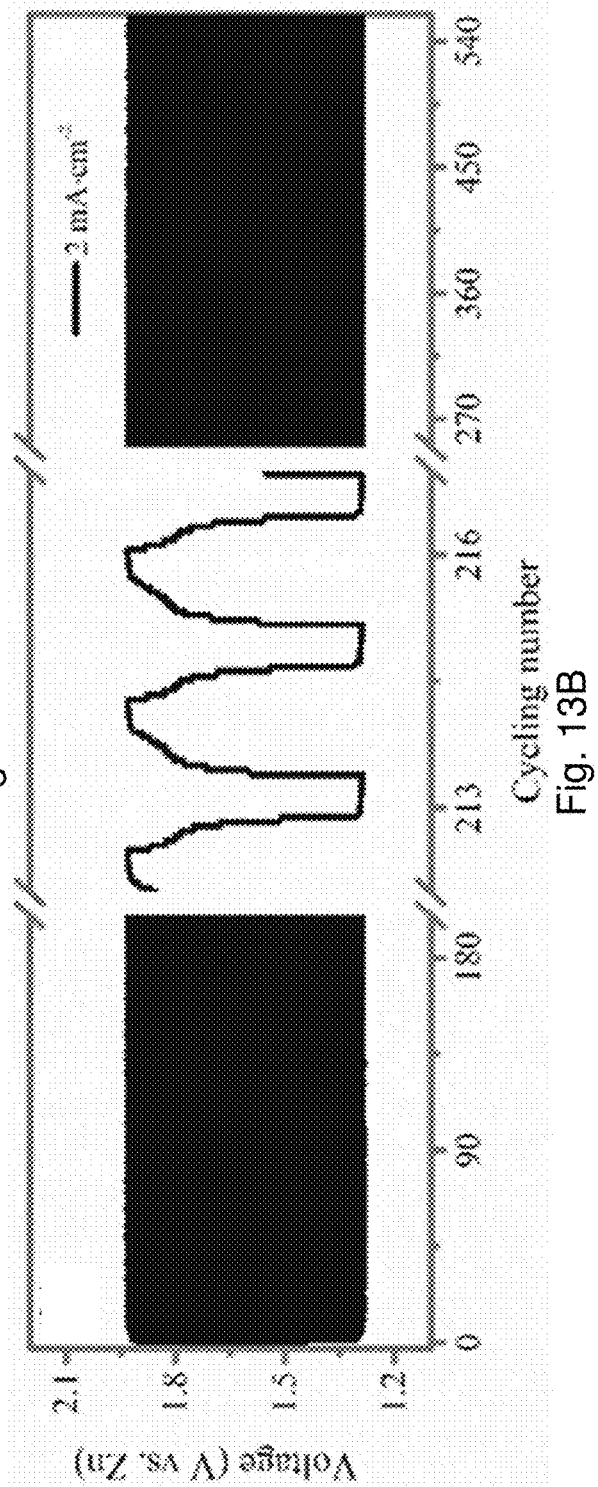
FIG. 13B is a plot of voltage against cycling number showing galvanostatic charge/discharge cycling stability of the integrated system.

It is ascribed to the fast-electrochemical kinetics of the zinc-don capacitor in addition, system of the present disclosure manifests an excellent electrochemical durability and charge/discharge voltage profiles. As shown in FIG. 13B, after 540 continuously charge/discharge cycling stability tests of the system, the voltage profiles remain unchanged, manifesting that the metallic Zn electrode can be fully recovered by external the power supply.

Taking the advantages from the flexible CFC-based electrode and the different hydrogel electrolytes, the "air-chargeable" zinc-ion capacitor of the present disclosure exhibits great flexibility. To investigate its "air-charging" functions under different deformations, squeezing, twisting and folding as well as compressing deformations are applied to the "air-chargeable" zinc-ion capacitors.

Figure 14A:
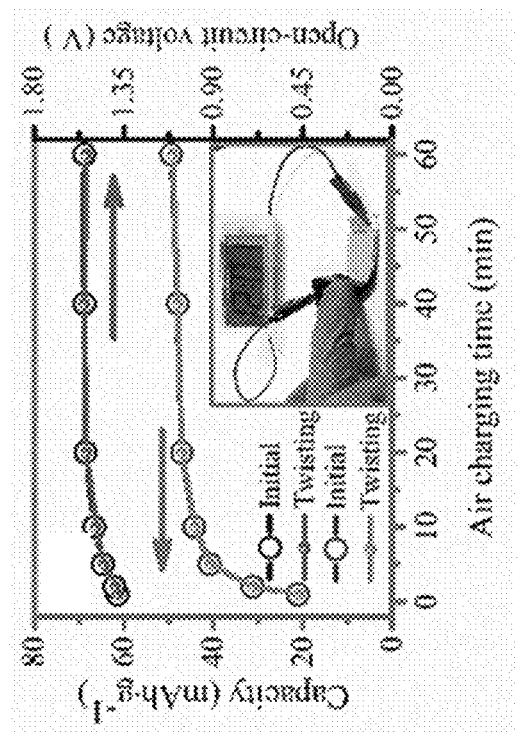
FIG. 14A is a plot of capacity against air-charging time showing the discharging curves and corresponding open-circuit voltages of the "air-chargeable" zinc-ion capacitor under squeezing deformations. The insert is an optical image showing a timer is powered by the "air-chargeable" zinc-ion capacitor under squeezing deformation.
Figure 14B:
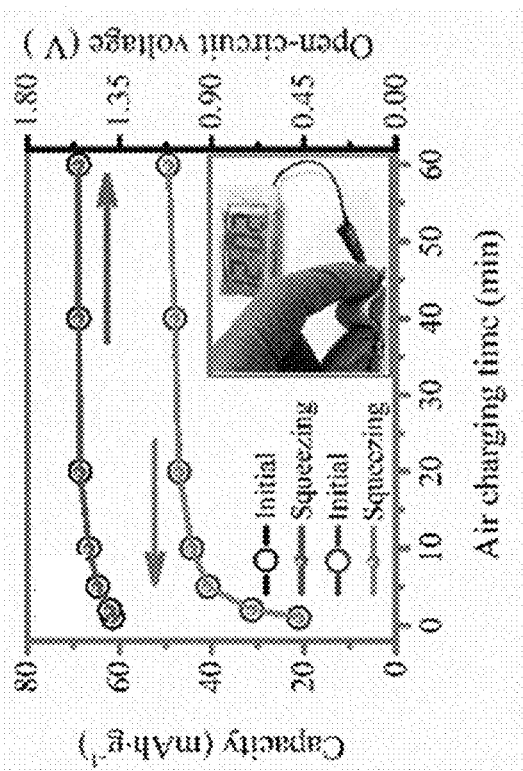
FIG. 14B is a plot of capacity against air-charging time showing the discharging curves and corresponding open-circuit voltages of the "air-chargeable" zinc-ion capacitor under twisting deformations. The insert is an optical image showing a timer is powered by the "air-chargeable" zinc-ion capacitor under twisting deformation.
Figure 14C:
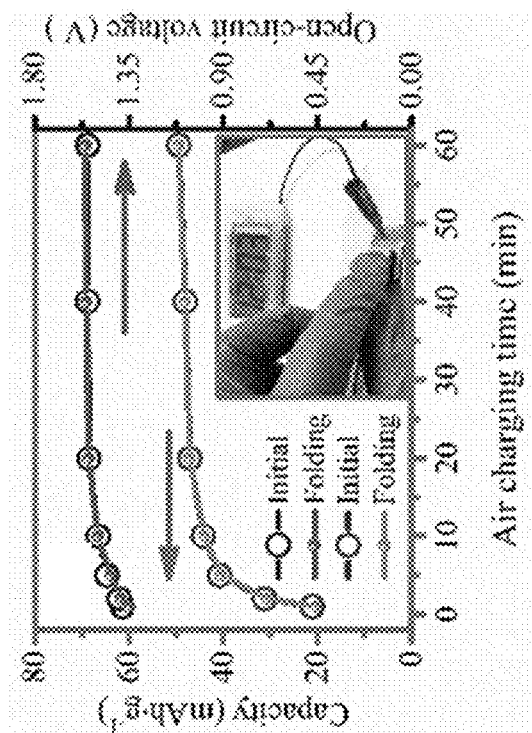
FIG. 14C is a plot of capacity against air-charging time, showing the discharging curves and corresponding open-circuit voltages of the "air-chargeable" zinc-ion capacitor under folding and compressing deformations. The insert is an optical image showing a timer is powered by the "air-chargeable" zinc-ion capacitor under folding and compressing deformations.

The electrochemical capacity and open-circuit voltage of the zinc on capacitor charged by air for different time periods under various deformations are shown in FIGS. 14A to 14C. The "air-charging" function maintains a stable performance, indicating its high durability and resistance under different mechanical deformations.

Figure 15A:
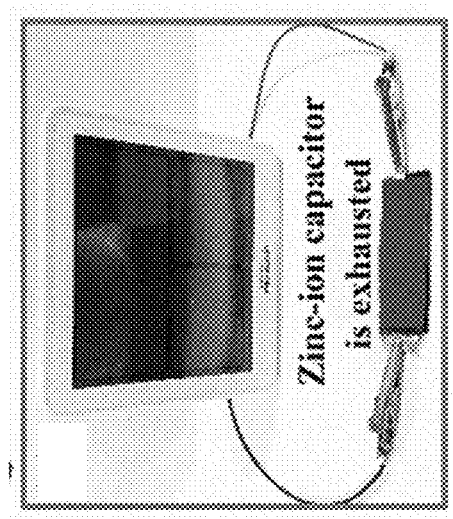
FIG. 15A is an optical image showing the zinc-ion capacitor is used to power a digital hygrometer.
Figure 15B:
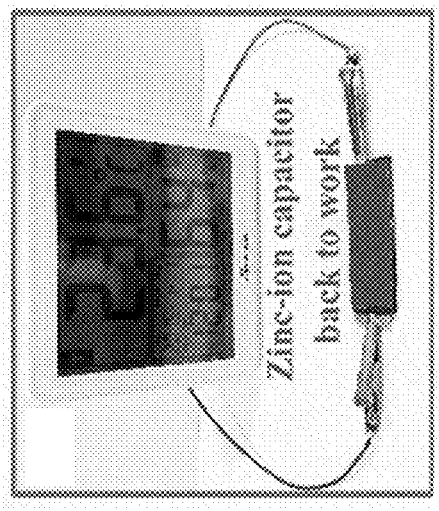
FIG. 15B is an optical image showing the zinc-ion capacitor is exhausted after working for several hours.
Figure 15C:
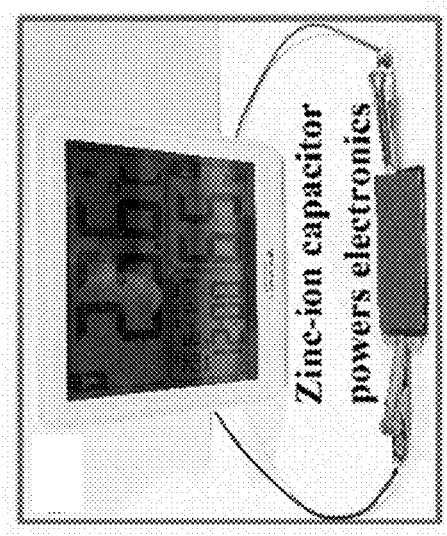
FIG. 15C is an optical image showing the "air-charging" function of the zinc-ion capacitor is triggered by the air diffused therein when the sealing tape is removed.
Figure 15D:
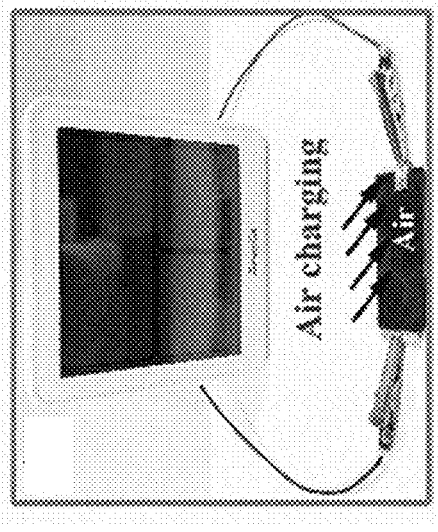
FIG. 15D is an optical image showing the zinc-ion capacitor is successfully charged and start to power the hygrometer again.

The operating process of the "air-chargeable" zinc-ion capacitor is investigated to illustrate the "air-charging" function of the apparatus and the results are shown in FIGS. 15A to 15D. As shown in FIG. 15A, a digital hygrometer can be operated when the zinc-ion capacitor is connected thereto. After several hours, the zinc-ion capacitor is exhausted (FIG. 15B). When the gas diffusion window of "air-charging" component is opened, the zinc-ion capacitor is being charged by air (FIG. 15C). When the gas diffusion window is sealed up again, the digital hygrometer works again (FIG. 15D). These results demonstrate that the zinc-ion capacitor was successfully charged by air. These demonstrations also highlights the "air-chargeable" zinc-ion capacitor is preferable for portable electronics and wearable applications.

Figure 16:
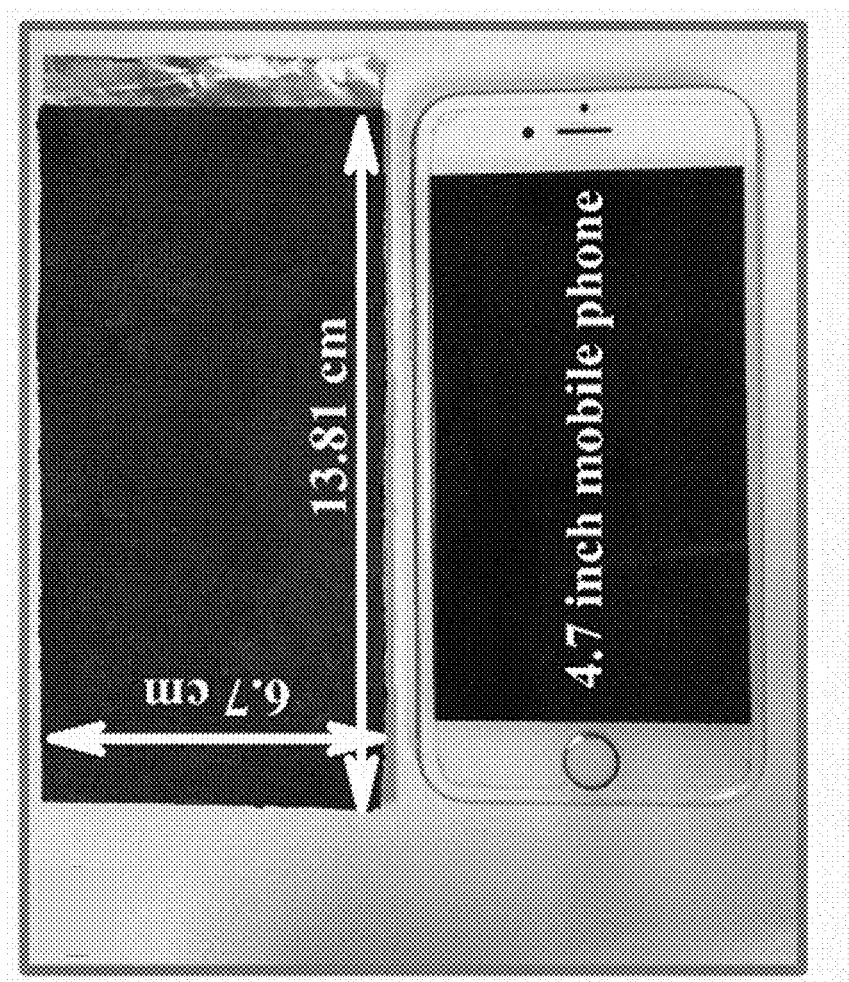
FIG. 16 is an optical image showing the "air-chargeable" zinc-vanadium battery of 4.7-inch mobile phone size.

Considering the practical application of energy storage in portable/wearable electronics, an "air-charging" zinc-vanadium battery with a large capacity has been developed. The "air-chargeable" zinc-vanadium battery was constructed in the same manner as the "air-chargeable" zinc-ion capacitor as shown in FIG. 1C. Specifically, the battery includes a commercial Pt/C modified CFC as the air electrode, a V$_2$O$_5$.xH$_2$O modified CFC as the cathode, a zinc foil as the anode, and PAM and PANa as the electrolytes, forming a sandwiched structures. The battery was constructed with a 4.7-inch mobile phone size (FIG. 16) so as to demonstrate the potential of the battery being applied in mobile applications.

Figure 17A:
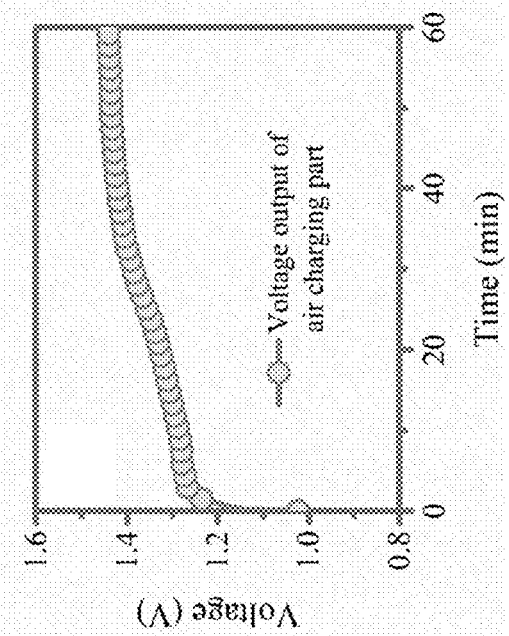
FIG. 17A is a plot of voltage against capacity showing the galvanostatic charge/discharge curves of the "air-chargeable" zinc-vanadium battery.
Figure 17B:
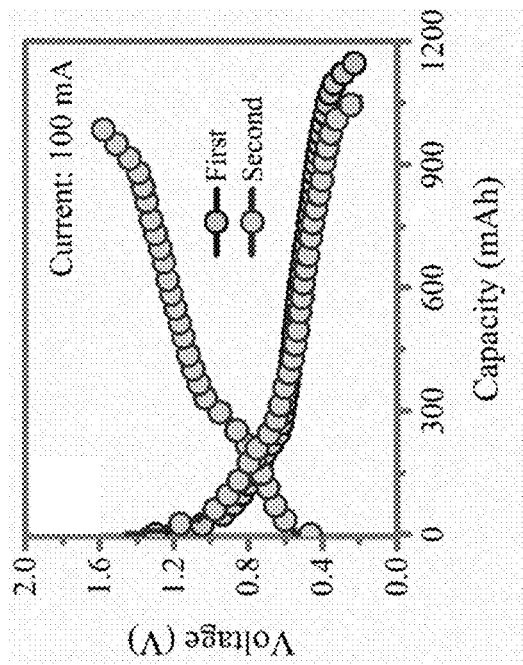
FIG. 17B is a plot of voltage against time showing the voltage profile of the "air-charging" component of the zinc-vanadium battery during charging.

The galvanostatic charge/discharge curves of the "air-charging" zinc-vanadium battery system are shown in FIG. 17A. The battery delivers a capacity of around 1000 mAh at current of 100 mA. The "air-charging" function works properly in the system. As shown in FIG. 17B, the voltage output of the "air-charging" component increases as the "air-charging" process proceeds. It is ascribed to the decrease in the voltage gap between the air electrode and the cathode as well as the decrease in current output of the "air-charging" part, resulting in an increase in the voltage of the "air-charging" part.

Figure 17C:
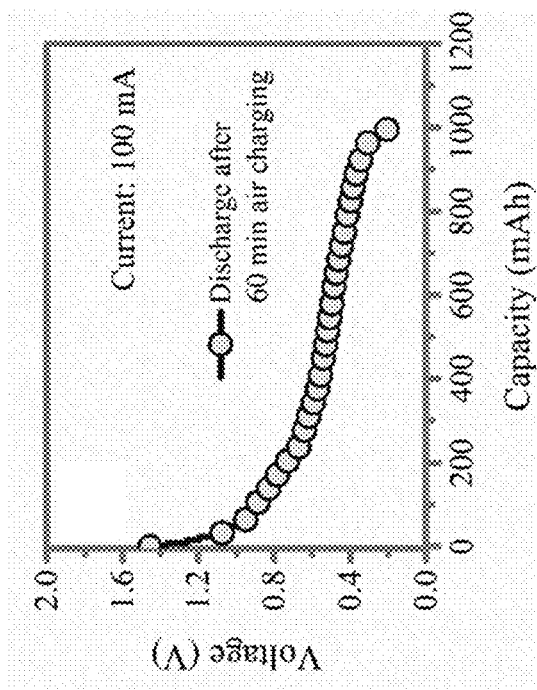
FIG. 17C is a plot of voltage against capacity showing the discharge curves of the "air-chargeable" zinc-vanadium battery after 60 min "air-charging".

After "air-charging" for 40 min, the voltage output of the "air charging" component becomes almost stable, indicating that the "air-charging" process is almost finished. The 4.7-inch mobile phone size "air-charging" zinc-vanadium battery with 1000 mAh capacity can be fully charged by air in one hour (FIG. 17C). This result strongly suggests that the integrated system of the present disclosure can effectively recover a 1000 mAh zinc-vanadium battery by harvesting energy from pervasive air.

The electrical energy storage apparatus of the present invention is advantageous since it successfully provides and demonstrates the concept of charging an energy storage device such as a battery or a supercapacitor without the constrain of natural environmental factors such as weathering. The apparatus of the present disclosure may be charged anytime at any places with air which is always accessible. The charging operation is also very convenient which only requires the user to remove an encapsulation layer such as a sealing tape to initiate the charging while restoring the encapsulation layer to pause or halt the charging process.

In addition, the apparatus is tiny and compact, which is highly advantageous in terms of portability and weight reduction of wearable electronics containing the apparatus of the present invention.

Furthermore, the apparatus comprises components that are made of flexible materials, such as flexible electrodes and electrolyte, rendering the apparatus highly flexible thereby high resistance to different mechanical deformations that are unavoidable during daily use. Also, the scaling up of the device is very cost effective as it does not require a water-free and/or oxygen-free environment for assembling the apparatus.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other form.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical energy storage apparatus comprising:
 a first energy storage device arranged to supply electrical energy to an external electrical load;
 a second energy storage device arranged to recharge the first energy storage device, and at least a portion of the second energy storage device is exposed to air;
 wherein the second energy storage device includes an encapsulation arranged to selectively block an air exposure to the second energy storage device, so as to maintain the second energy storage device in an idle state; and selectively expose the second energy storage device to air, so as to charge the first energy storage device.

2. The electrical energy storage apparatus according to claim 1, wherein the encapsulation is arranged to selectively block the air exposure to an electrode of the second energy storage device.

3. The electrical energy storage apparatus according to claim 2, wherein the electrode includes an active material of the second energy storage device.

4. The electrical energy storage apparatus according to claim 3, wherein the active material is selected from the group consisting of porous carbon/Co4N, Pt/C, $V_2O_5 \cdot xH_2O$ and their combination thereof.

5. The electrical energy storage apparatus according to claim 2, wherein the electrode is a cathode of the second energy storage device.

6. The electrical energy storage apparatus according to claim 5, wherein the encapsulation is at least partially removable from the second energy storage device so as to selectively expose the cathode of the second energy storage device to air.

7. The electrical energy storage apparatus according to claim 6, wherein when the encapsulation fully covers the cathode of the second energy storage device, the second energy storage device maintains in the idle state.

8. The electrical energy storage apparatus according to claim 7, wherein the encapsulation includes a sealing tape fully covering the cathode of the second energy storage device so as to block the air exposure to the cathode.

9. The electrical energy storage apparatus according to claim 6, wherein when the encapsulation is at least partially removed from the second energy storage device, the second energy storage device is activated and is further arranged to recharge the first energy storage device.

10. The electrical energy storage apparatus according to claim 9, wherein when the electrode is exposed to air, the second energy storage device is activated by oxygen in air in contact with the cathode of the second energy storage device.

11. The electrical energy storage apparatus according to claim 10, wherein the cathode is arranged to catalyze an oxidation reaction of oxygen in air in contact with the cathode and a reduction reaction at an anode in the second energy storage device so as to generate electrical charges to recharge the first energy storage device.

12. The electrical energy storage apparatus according to claim 11, wherein the second energy storage device includes a zinc anode.

13. The electrical energy storage apparatus according to claim 1, wherein the second energy storage device comprises a first electrolyte including a first hydrogel.

14. The electrical energy storage apparatus according to claim 13, wherein the first hydrogel includes sodium polyacrylate.

15. The electrical energy storage apparatus according to claim 13, wherein the first energy storage device includes a second electrolyte.

16. The electrical energy storage apparatus according to claim 15, wherein the second electrolyte is different from the first electrolyte.

17. The electrical energy storage apparatus according to claim 16, wherein the second electrolyte includes a second hydrogel of polyacrylamide.

18. The electrical energy storage apparatus according to claim 1, wherein the first energy storage device comprises a cathode including an active material different from the second energy storage device.

19. The electrical energy storage apparatus according to claim 1, wherein the first energy storage device comprises a cathode including an active material being the same as that of the second energy storage device.

20. The electrical energy storage apparatus according to claim 1, wherein the first energy storage device and the second energy storage device include a common anode and/or a common cathode.

21. The electrical energy storage apparatus according to claim 20, wherein the common anode and/or the common cathode are foldable such that the second energy storage device is stacked on the first energy storage device.

22. The electrical energy storage apparatus according to claim 20, wherein the common anode and the common cathode are flexible such that in combination with electrolytes of the first and the second energy storage devices, the energy storage apparatus is arranged to physically deform when subjected to an external mechanical load.

23. The electrical energy storage apparatus according to claim 1, wherein both the first and the second energy storage devices are recharged when upon receiving electrical power from an external power supply being connected to one or both of the first and the second energy storage devices.

* * * * *